(12) United States Patent
Sugahara et al.

(10) Patent No.: US 8,675,497 B2
(45) Date of Patent: Mar. 18, 2014

(54) COMMUNICATION QUALITY EVALUATION SYSTEM, DEVICE, METHOD, AND PROGRAM THEREOF

(75) Inventors: Hiroto Sugahara, Minato-ku (JP); Takashi Ono, Minato-ku (JP)

(73) Assignee: NEC Corporation, Tokyo (JP)

( * ) Notice: Subject to any disclaimer, the term of this patent is extended or adjusted under 35 U.S.C. 154(b) by 503 days.

(21) Appl. No.: 12/446,903

(22) PCT Filed: Nov. 20, 2007

(86) PCT No.: PCT/JP2007/072457
§ 371 (c)(1),
(2), (4) Date: Apr. 23, 2009

(87) PCT Pub. No.: WO2008/065933
PCT Pub. Date: Jun. 5, 2008

(65) Prior Publication Data
US 2010/0091668 A1    Apr. 15, 2010

(30) Foreign Application Priority Data
Nov. 27, 2006   (JP) .................................. 2006-318769

(51) Int. Cl.
*H04J 1/16*    (2006.01)
*H04M 3/22*    (2006.01)

(52) U.S. Cl.
USPC ..... 370/242; 370/252; 379/26.01; 379/27.03; 455/67.11; 455/67.13

(58) Field of Classification Search
USPC ......... 370/331, 332, 338, 242, 247, 251, 253, 370/328; 455/67.11, 423, 67.12, 67.13, 455/67.14; 704/216, 220; 379/26.01, 26.02, 379/27.03, 27.04, 32.1
See application file for complete search history.

(56) References Cited

U.S. PATENT DOCUMENTS

2003/0003874 A1\*  1/2003  Nitta et al. .................... 455/67.1
2004/0097237 A1\*  5/2004  Aoyama ........................ 455/445

(Continued)

FOREIGN PATENT DOCUMENTS

| JP | 2004-510372 A | 4/2004 |
| JP | 2005-094634 A | 4/2005 |
| JP | 2005-303472 A | 10/2005 |

(Continued)

OTHER PUBLICATIONS

Teruya Fujii, "Radiowave Propagation Handbook", Realize Inc., pp. 234-243, Jan. 28, 1999.

*Primary Examiner* — Michael Thier
*Assistant Examiner* — Awet Haile
(74) *Attorney, Agent, or Firm* — Sughrue Mion, PLLC

(57) ABSTRACT

A communication quality evaluation system, a device, a method, and a program for evaluating communication quality at an arbitrary location, in the form which can actually felt by a user, are provided. According to an instruction from an evaluator, a control device displays a map or layout diagram of a specified area on a map/layout diagram display device and specifies an evaluation point within a display range of the map or the layout diagram. According to the network quality estimated by a network quality estimation unit, a network quality simulation unit for estimating the network quality when communications are performed at the evaluation point deteriorates the evaluation data and transmits the data to an evaluation device. The evaluation data deteriorated is a sample of data actually transmitted and received in the communication system. The evaluation device uses a communication device actually used by a user in the communication system.

19 Claims, 13 Drawing Sheets

(56) References Cited

U.S. PATENT DOCUMENTS

| | | | |
|---|---|---|---|
| 2004/0128123 A1* | 7/2004 | Kashiwagi | 704/201 |
| 2005/0129006 A1* | 6/2005 | Aoyagi et al. | 370/377 |
| 2005/0265321 A1 | 12/2005 | Rappaport et al. | |
| 2006/0067275 A1* | 3/2006 | Yang et al. | 370/332 |
| 2006/0126529 A1* | 6/2006 | Hardy | 370/252 |
| 2007/0004394 A1* | 1/2007 | Chu et al. | 455/422.1 |
| 2007/0253337 A1 | 11/2007 | Morinaga et al. | |

FOREIGN PATENT DOCUMENTS

| | | |
|---|---|---|
| JP | 2006-165870 A | 6/2006 |
| JP | 2006-303788 A | 11/2006 |
| WO | 2006/070471 A1 | 7/2006 |
| WO | 2006/115068 A1 | 11/2006 |

* cited by examiner

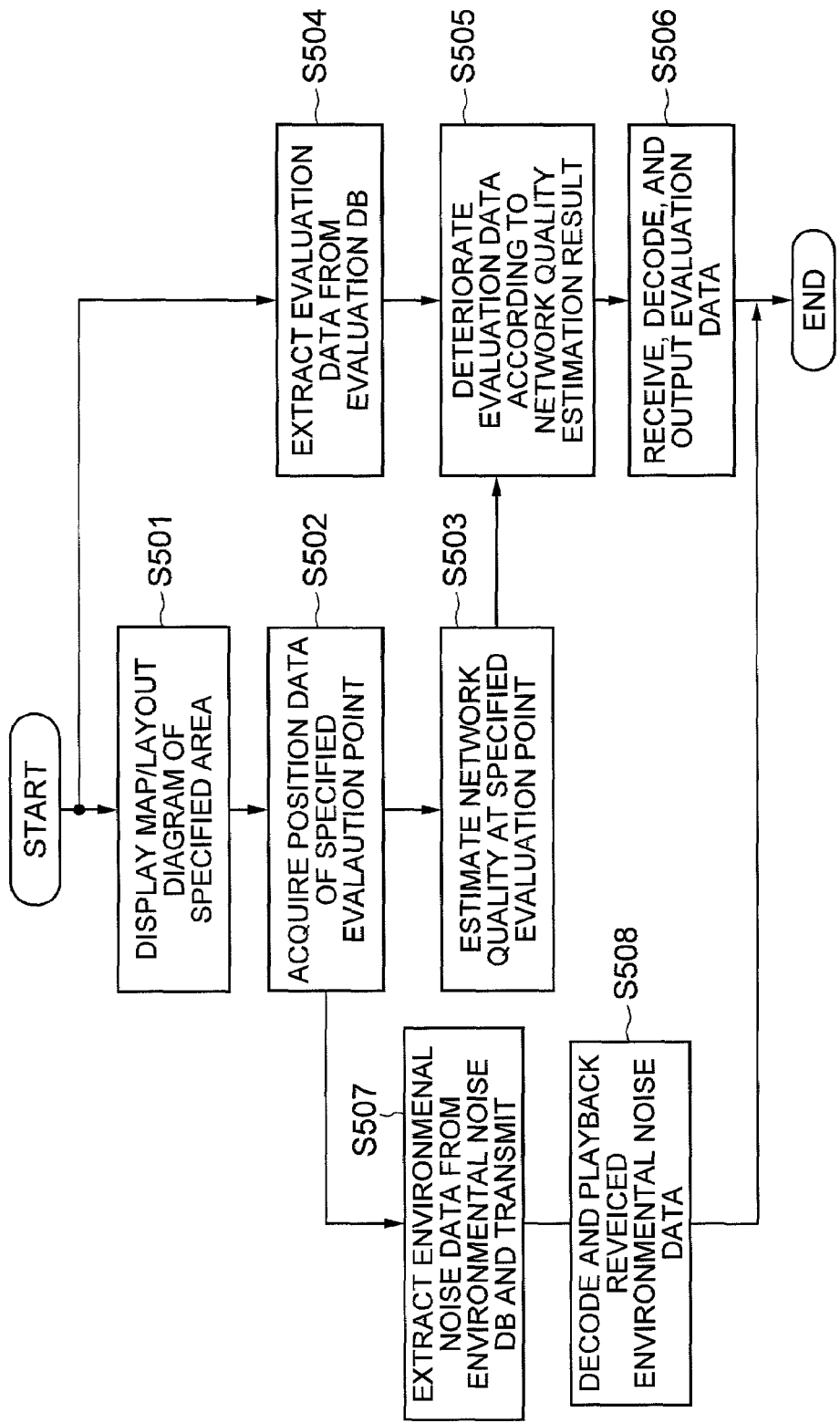

COMMUNICATION QUALITY EVALUATION SYSTEM, DEVICE, METHOD, AND PROGRAM THEREOF

TECHNICAL FIELD

The present invention relates to a communication quality evaluation system, device, method, and program used for evaluating communication quality in equipment planning and design of communication networks, and in particular, to a communication quality evaluation system, device, method, and program for evaluating communication quality actually felt by users.

BACKGROUND ART

In equipment planning and design of communication networks for a wireless communication system, communication quality is needed to be evaluated with use of a quality evaluation system, in order to identify problematic areas to be addressed or to verify effects provided by changes in the equipment and planning conditions. Related methods for evaluating communication quality in quality evaluation systems and devices include a method disclosed in Patent Document 1.

Patent Document 1 discloses an evaluation method in which call quality information of each mobile terminal is collected via base stations, and positional information of the mobile terminal is collected based on signal propagation delay time information between a plurality of base stations near the mobile terminal and the mobile terminal, and the call quality information and the positional information are correlated and the evaluation result is shown on a map. Specifically, Patent Document 1 discloses an evaluation method in which frame error rates are collected as call quality information, and circles are marked at locations where mobile terminals have call quality of predetermined value or higher and crosses are marked at locations where mobile terminals have call quality lower than the predetermined value.

Patent Document 1: Japanese Patent Laid-Open Publication No. 2005-94634 (paragraphs 0014 to 0047, FIG. 1)

DISCLOSURE OF THE INVENTION

Problems to be Solved by the Invention

In a case of a voice communication, communication quality actually felt by a use is determined by combination of causes such as sound interruption, delay, session interruption, response deterioration, and noise increase. As such, in the communication quality estimation method only based on frame error rates disclosed in Patent Document 1, the quality which is actually felt by a user cannot be evaluated in detail.

As such, in the method described in Patent Document 1, erroneous determinations will be made, including a user being not satisfied with the communication quality in a location where a circle is shown on the map, or a user being actually satisfied with the communication quality in a location where a cross is shown on the map.

It is therefore an exemplary object of the invention to provide a communication quality evaluation system, device, method, and program for evaluating communication quality at any location in the manner of being actually felt by a user.

Means for Solving the Problems

A communication quality evaluation system according to an exemplary aspect of the invention is a system for evaluating communication quality of a communication system, including: a control unit which displays a map or a layout diagram of a specified area on a display unit in accordance with an instruction by an evaluator, and specifies an evaluation point which is a position to be evaluated for communication quality by the evaluator within a display range of the map or the layout diagram displayed on the display unit in accordance with an instruction by the evaluator, a quality estimation unit which estimates network quality when communications are performed at the evaluation point, and a quality simulation unit which deteriorates evaluation data used for evaluating communication quality according to the network quality estimated by the quality estimation unit, and transmits the deteriorated evaluation data to an evaluation device for evaluating the communication quality. The evaluation data deteriorated by the quality simulation unit is a sample of data to be actually transmitted and received in the communication system.

A communication quality evaluation device according to another exemplary aspect of the invention is a device for evaluating communication quality of a communication system, including: a quality estimation unit which estimates network quality when communications are performed at an evaluation point which is a position specified by an evaluator and to be evaluated for communication quality by the evaluator, and a quality simulation unit which deteriorates evaluation data used for evaluating communication quality according to the network quality estimated by the quality estimation unit, and transmits the deteriorated evaluation data to an evaluation device for evaluating the communication quality. The evaluation data deteriorated by the quality simulation unit is a sample of data to be actually transmitted and received in the communication system.

A communication quality evaluation method according to still another exemplary aspect of the invention is a method for evaluating communication quality of a communication system, including: a controlling step for displaying a map or a layout diagram of a specified area on a display unit in accordance with an instruction by an evaluator, and specifying an evaluation point which is a position to be evaluated for communication quality by the evaluator within a display range of the map or the layout diagram displayed on the display unit in accordance with an instruction by the evaluator, a quality estimation step for estimating network quality when communications are performed at the evaluation point, and a quality simulation step for deteriorating evaluation data used for evaluating communication quality according to the network quality estimated in the quality estimation step, and transmitting the deteriorated evaluation data to an evaluation device for evaluating the communication quality. The evaluation data deteriorated in the quality simulation step is a sample of data to be actually transmitted and received in the communication system.

A communication quality evaluation program according to still another exemplary aspect of the invention is a program for evaluating communication quality of a communication system, causing a computer to perform: quality estimation processing for estimating network quality when communications are performed at an evaluation point specified by an evaluator, and quality simulation processing for deteriorating evaluation data which is a sample of data to be actually transmitted and received in the communication system and used for evaluating communication quality in accordance with the network quality estimated by the quality estimation processing, and transmitting the deteriorated evaluation data to an evaluation device for evaluating the communication quality.

Effects of the Invention

According to the present invention, by evaluating communication quality at an evaluation point specified on a map or on a layout diagram using a sample of data (e.g., sound or image) to be actually transmitted and received by a user, communication quality at any location can be evaluated in a manner actually felt by the user. Consequently, a person in charge of equipment planning and design of a communication network can efficiently perform operations such as identification of problematic areas to be addressed and verification of effects provided by changes in the equipment and design conditions.

In the case where the present invention is configured such that the quality estimation unit estimates the network quality when communications are performed between specified evaluation points, and that the quality simulation unit deteriorates evaluation data according to the estimated network quality and transmits the data to a plurality of evaluation devices for evaluating the communication quality, the evaluation data is transmitted and received between the plurality of evaluation devices, whereby evaluation of communication quality can be performed in a dialogue form.

In the case where the present invention is configured such that the quality estimation unit estimates a radio wave environment when communications are performed at an evaluation point, and that the quality simulation unit deteriorates the evaluation data according to the estimated radio wave environment and transmits the data to an evaluation device via the communication system which is actually operated, evaluation of communication quality can be performed in the actual traffic state or radio wave environment.

In the case where the present invention is configured to include an evaluation database in which evaluation data is applied with deterioration processing due to the network quality and stored while being associated with locations, evaluation of communication quality can be performed without a measure for performing deterioration processing on the evaluation data.

In the case where the present invention is configured to include an environmental noise database in which environmental noise data is stored while being associated with locations; an environmental noise data extraction unit which extracts environmental noise data from the environmental noise database corresponding to the specified evaluation point; and an evaluation noise playback unit which outputs a sound corresponding to the extracted environmental noise data, evaluation of communication quality can be performed while considering environmental noises corresponding to a situation where sound communications are performed at a position having large environmental noises such as a busy street.

In the case where the present invention is configured such that a communication device used by a user is used as an evaluation device, evaluation of communication quality can be performed in a state closer to that of the quality felt by the user.

In the case where an evaluation point is specified by an evaluator over a communication network in the control unit and the quality simulation unit is configured for transmitting evaluation data to an evaluation device over the communication network, it is possible to allow an evaluator in a remote area relative to the position where the quality simulation unit and the like are disposed to perform evaluation of communication quality.

BEST MODE FOR CARRYING OUT THE INVENTION

First Exemplary Embodiment

A first exemplary embodiment of the invention will be described with reference to the drawings. FIG. 1 is a block diagram showing the configuration of the first exemplary embodiment of a communication quality evaluation system according to the present invention. As shown in FIG. 1, the communication quality evaluation system of the first exemplary embodiment includes a control device (control unit) 800 which controls a map/layout diagram display device (display unit) 100, a position specifying device 200, and a map/layout diagram database (DB) 120, which are connected to the control device, and a quality simulation device 300 which transmits evaluation data to an evaluation device 400.

The map/layout diagram display device 100 includes a map/layout diagram display unit 110. The map/layout diagram display unit 110 has a function of displaying a map or a layout diagram of a specified area based on map data or layout diagram data extracted from the map/layout diagram DB 120 storing the map data or the layout data, in accordance with control by the control device 800 operated by an evaluator.

The map/layout diagram display device 100 may be a touch panel, a monitor such as a CRT (Cathode Ray Tube) display or a TFT (Thin Film Transistor) liquid crystal display, or a screen or a table to which a map or a layout diagram is projected by a projector, for example.

The position specifying device 200 includes a position specifying unit 210. The position specifying unit 210 has a function of specifying a position (evaluation point) for which the evaluator evaluates the communication quality, within the map or the layout diagram shown on the map/layout diagram display device 100. Note that the control device 800 may specify an evaluation point in accordance with operation performed on the position specifying device 200.

The position specifying device 200 may be a mouse device, a slide pad, or a tangible device capable of specifying a position when being placed on the map/layout diagram display device 100.

In the case where the map/layout diagram display device 100 is a touch panel, a sensor provided at a position corresponding to a position where a position specifying person touches on the touch panel works as the position specifying unit 210.

The quality simulation device 300 includes a network quality estimation unit (quality estimation unit) 310, an evaluation DB 320, and a network quality simulation unit (quality simulation unit) 340. The network quality estimation unit 310 has a function of estimating network quality when communications are performed at an evaluation point specified by the position specifying device 200. A method of estimating the network quality by the network quality estimation unit 310 will be described later.

The evaluation DB 320 stores data (evaluation data) for evaluating network quality by an evaluator. As the evaluation data stored in the evaluation DB 320, a sample of data to be actually transmitted and received in the wireless communication system to be evaluated will be used, for example.

Specifically, in the case of evaluating network quality of a wireless communication system in which sound communications are performed, a sample of sound data (e.g., data of WAV format or MP3 format) will be used as evaluation data, for example. Further, in the case of evaluating network quality of a wireless communication system in which a file such as Web page data is to be downloaded, a sample of data in HTML format will be used as evaluation data, for example. Further, in the case of evaluating network quality of a wireless communication system in which transmission and reception of e-mail is performed, a sample of e-mail data will be used as evaluation data, for example.

The network quality simulation unit 340 deteriorates evaluation data according to the network quality estimated by the network quality estimation unit 310, and transmits the deteriorated evaluation data to the evaluation device 400.

Specifically, the network quality simulation unit 340 intentionally inverses the evaluation data which is a binary sequence of 0 and 1 in accordance with probability based on the network quality estimated by the network quality estimation unit 310 to thereby simulate a bit error rate, for example. Further, as the evaluation data is transmitted as a group of packets, the network quality simulation unit 340 simulates a packet loss by intentionally removing some packets from the evaluation data, or simulates a delay by delaying transmission of some evaluation data, for example.

The evaluation device 400 includes an evaluation data reception unit 410 and an evaluation data decoding unit 420. The evaluation data reception unit 410 has a function of receiving evaluation data transmitted from the quality simulation unit 300. The evaluation data decoding unit 420 has a function of decoding the evaluation data received by the evaluation data reception unit 410 into a form capable of being evaluated by an evaluator.

The evaluation device 400 is preferably a communication device which is to be actually used by a user in the wireless communication system to be evaluated. For example, in the case of evaluating call quality of a mobile phone system, it is preferable to use an actual mobile telephone terminal in order to evaluate the quality felt by the user in a state closer to the actual use.

Note that the quality simulation device 300 is realized by a server or the like, in which a communication quality evaluation program for causing a computer to perform: a quality estimation process for estimating network quality when communications are performed at an evaluation point specified by an evaluator; and a quality simulation process for deteriorating evaluation data used for evaluating communication quality according to the network quality estimated in the quality estimation process, and transmitting the deteriorated evaluation data to an evaluation device for evaluating the communication quality, is installed.

FIG. 2 is a flowchart schematically showing the operation of the first exemplary embodiment of the communication quality evaluation system according to the present invention. First, the control device 800 extracts, among map data and layout diagram data stored in the map/layout diagram DB 120, map data or layout diagram data corresponding to the area specified by an evaluator, from the map/layout diagram DB 120, and displays a map or a layout diagram of the area on the map/layout diagram display device 100 (step S101).

Next, when the position specifying device 200 is operated and an evaluation point is specified, the control device 800 acquires position data indicating the evaluation point specified by the position specifying device 200 within the area of the map or the layout diagram displayed on the map/layout diagram display device 100 (step S102). Further, the network quality estimation unit 310 estimates network quality when communications are performed at the evaluation point specified at step S102 (step S103).

Further, the network quality simulation unit 340 extracts evaluation data from the evaluation DB 320 (step S104). Next, the network quality simulation unit 340 deteriorates the evaluation data extracted at step S104 according to the network quality estimated at step S103 by the network quality estimation unit 310 (step S105), and transmits the data to the evaluation device 400. The evaluation device 400 receives the evaluation data deteriorated at step S105, decodes the data into a form capable of being evaluated by the evaluator, and outputs it (step S106).

Although the flowchart shown in FIG. 6 shows that the operation of step S101 to S103 and the operation of step S104 are carried out in parallel, the operation of step S104 may be performed after step S103.

Next, a method of estimating network quality by the network quality estimation unit 310 will be described. FIG. 3 is a block diagram showing an exemplary configuration of the network quality estimation unit 310 which calculates a quality parameter using radio wave environment data and traffic data.

In the example shown in FIG. 3, the network quality estimation unit 310 includes a quality parameter calculation unit 310a which calculates a quality parameter, a radio wave environment database (DB) 310b storing radio wave environment data, and a traffic database (DB) 310c storing traffic data.

In the radio wave environment DB 310b, radio wave environment data indicating measured or estimated reception signal electric power, a signal to noise ratio, and delay spread is stored therein while being associated with locations. In the traffic DB 310c, traffic data indicating measured or estimated traffic volumes for each cell is stored while being associated with locations.

The quality parameter calculation unit 310a has stored a correspondence table for associating radio wave environment data, traffic data, and quality parameters. The quality parameter calculation unit 310a acquires radio wave environment data at the evaluation point specified by the position specifying device 200 from the radio wave environment DB 310b, and acquires traffic data in the cell at the evaluation point from the traffic DB 310c. The quality parameter calculation unit 310a refers to the correspondence table which has been stored, and calculates a quality parameter at the evaluation point based on the acquired radio wave environment data and traffic data.

In the correspondence table, it is assumed that a reception signal electric power of −80 dBm and a traffic volume of 5 erlang (erl) are associated with a delay amount of 0.5 second, a reception signal electric power of −80 dBm and a traffic volume of 10 erl are associated with a delay amount of 0.7 second, a reception signal electric power of −100 dBm and a traffic volume of 5 erl are associated with a delay amount of 1.2 second, and a reception signal electric power of −100 dBm and a traffic volume of 10 erl are associated with a delay amount of 1.4 second, for example.

When the quality parameter calculation unit 310a acquires radio wave environment data of −81.2 dBm from the radio wave environment DB 310b and traffic data of 4.8 erl from the traffic DB 310, the quality parameter calculation unit 310a refers to the correspondence table and calculates that the delay amount is about 0.5 second.

Note that in the correspondence table, the quality parameters associated with the radio wave environment data and the traffic data may include packet loss rates and bit error rates, in addition to the delay amount.

As the radio wave environment data and the traffic data described above change depending not only on locations but also on times, the network quality estimation unit 310 may include a unit for inputting specified time, and the radio wave environment data and the traffic data may be stored in the radio wave environment DB 310b and the traffic DB 310c respectively while being associated with times and locations.

With such a configuration, the quality parameter calculation unit 310a is able to calculate a quality parameter at the specified time and place.

Further, although the network quality estimation unit 310 shown in FIG. 3 acquires the radio wave environment data from the radio wave environment DB 310b, the network quality estimation unit 310 may carry out radio wave propagation simulation after the evaluation point has been specified by the position specifying device 200 to thereby estimate radio wave environment data at the evaluation point.

FIG. 4 is a block diagram showing an exemplary configuration of the network quality estimation unit 310 which extracts the measured quality parameter. According to the exemplary embodiment, the network quality estimation unit 310 includes a quality parameter extraction unit 310d and a quality measurement database (DB) 310e. In the quality measurement DB (quality database) 310e, measured quality parameters are stored while being associated with locations. The quality parameter extraction unit 310d extracts a quality parameter corresponding to the evaluation point from the quality measurement DB 310e based on the position data transmitted from the control device 800.

As the quality parameter stored in the quality measurement DB 310e change depending not only on places but also times, the network quality estimation unit 310 may include a unit for inputting a specified time, and in the quality measurement DB 310e, the quality parameters may be stored while being associated with times and places. With such a configuration, the quality parameter extraction unit 310d is able to extract the quality parameter at the specified time and place.

Although data having been stored in the evaluation DB 320 is used as evaluation data in the exemplary embodiment, it is also acceptable that an operator gives a test voice, and that data formed by encoding the test voice is used as evaluation data. In that case, an evaluation data encoding unit for encoding the test voice is used instead of the evaluation DB 320.

In the exemplary embodiment, as the communication quality at the evaluation point specified on a map or a layout diagram is evaluated using a sample (e.g., sound or image) of data to be actually communicated by a user, it is possible to evaluate the communication quality of any location in the manner actually felt by the user. As a result, a person in charge of equipment planning or design of the communication network is able to efficiently perform works such as identification of problematic areas to be addressed and verification of effects provided by changes in the equipment and design conditions.

The radio wave environment DB 310b may store radio wave propagation data calculated by radio wave propagation estimation using a deterministic propagation estimation method. An example of the deterministic propagation estimation method is a ray tracing method described in the following reference document 1.

[Reference Document 1]

"Radiowave Propagation Handbook" by Teruya Fujii, Realize Inc., pp. 234-243, Jan. 28, 1999

Second Exemplary Embodiment

A second exemplary embodiment of the invention will be described with reference to the drawings. FIG. 5 is a block diagram showing the configuration of the second exemplary embodiment of the communication quality evaluation system according to the present invention.

As shown in FIG. 5, the communication quality evaluation system of the second exemplary embodiment includes a control device 800 which controls a map/layout diagram display device 100, a position specifying device 201a, a position specifying device 201b, and a map/layout diagram database (DB) 120, which are connected to the control device 800, and a quality simulation device 301 which transmits evaluation data to an evaluation device 401a and an evaluation device 401b.

Although the communication quality evaluation system of the first exemplary embodiment is adapted such that the quality simulation device 300 unilaterally transmits evaluation data to the evaluation device 400 so as to cause an evaluator to monitor the operation of the evaluation device 400 according to the transmitted evaluation data and to evaluate the communication quality, the communication quality evaluation system of the second exemplary embodiment is adapted such that the position specifying device 201a and the position specifying device 201b specify two evaluation points, and the two evaluation devices according to the respective evaluation points transmit and receive evaluation data to thereby enable communication quality evaluation to be performed in a dialogue form.

The configuration of the map/layout diagram display device 100 and the specific example of the device are the same as those described in the first exemplary embodiment.

The position specifying device 201a includes a position specifying unit 211a, and the position specifying device 201b includes a position specifying unit 211b. The position specifying unit 211a and the position specifying unit 211b has a function of specifying a position (evaluation point) at which the communication quality is evaluated by an evaluator, within the map or layout diagram displayed on the map/layout diagram display device 100. That is, in the second exemplary embodiment, two evaluation points are specified with use of the respective position specifying devices. Specific examples of the position specifying device 201a and the position specifying device 201b are the same as that described for the position specifying device 200 in the description of the first exemplary embodiment.

Although the example shown in FIG. 5 shows that the position specifying device 201a and the position specifying device 201b include the position specifying unit 211a and the position specifying unit 211b respectively, it is also acceptable that one position specifying device includes a plurality of (e.g., two) position specifying units.

The quality simulation device 301 includes a network quality estimation unit 311 and a network quality simulation unit 340. The network quality estimation unit 311 has a function of estimating the network quality when communications are performed between the two evaluation points specified by the position specifying device 201a and the position specifying device 201b. A specific network quality estimation method is the same as that described in the first exemplary embodiment.

The network quality simulation unit 340 has a function of deteriorating evaluation data to be transmitted between the evaluation device 401a and the evaluation device 401b based on the network quality estimated by the network quality estimation unit 311. Specifically, the network quality simulation unit 340 deteriorates evaluation data by causing packet error, delay, or the like in the evaluation data.

The evaluation device 401a includes an evaluation data transmission/reception unit 411a and an evaluation data encoding/decoding unit 421a, and the evaluation device 401b includes an evaluation data transmission/reception unit 411b and an evaluation data encoding/decoding unit 421b.

The evaluation data transmission/reception unit 411a receives evaluation data transmitted from the evaluation device 401b via the quality simulation device 301, and transmits the evaluation data encoded by the evaluation data encoding/decoding unit 421*a* to the evaluation device 401*b* via the quality simulation device 301. The evaluation data transmission/reception unit 411*b* receives evaluation data transmitted from the evaluation device 401*a* via the quality simulation device 301, and transmits the evaluation data encoded by the evaluation data encoding/decoding unit 421*b* to the evaluation device 401*a* via the quality simulation device 301.

The evaluation data encoding/decoding unit 421*a* decodes the evaluation data received by the evaluation data transmission/reception unit 411*a* into a form capable of being evaluated by an evaluator of the evaluation device 401*a* and outputs the data, and encodes evaluation data generated by the evaluator of the evaluation device a. The evaluation data encoding/decoding unit 421*b* decodes evaluation data received by the evaluation data transmission/reception unit 411*b* into a form capable of being evaluated by an evaluator of the evaluation device 401*b* and outputs the data, and encodes evaluation data generated by the evaluator of the evaluation device b.

Evaluation data generated by an evaluator may be sound data indicating sound signals based on sounds rendered by the evaluator, for example.

Note that specific devices of the evaluation device 401*a* and the evaluation device 401*b* are the same as the example of the evaluation device 400 shown in the first exemplary embodiment.

FIG. 6 is a flowchart schematically showing the operation of the second exemplary embodiment of the communication quality evaluation system according to the present invention.

First, the control device 800 extracts map data or layout diagram data, among map data or layout diagram data stored in the map/layout diagram DB 120, according to the area specified by an evaluator from the map/layout diagram DB 120, and displays the map or the layout diagram of the area on the map/layout diagram display device 100 (step S201).

Next, when the position specifying device 201*a* and the position specifying device 201*b* are operated and two evaluation points are specified, the control device 800 acquires position data indicating the two evaluation points specified by the position specifying device 200 within the area of the map or the layout diagram displayed on the map/layout diagram display device 100 (step S202). Further, the network quality estimation unit 311 estimates the network quality when communications are performed between the two evaluation points specified at step S202 (step S203).

Further, the evaluation data encoding/decoding unit 421*a* of the evaluation device 401*a* and the evaluation data encoding/decoding unit 421*b* of the evaluation device 401*b* encode evaluation data generated by the evaluators. The evaluation data transmission/reception unit 411*a* and the evaluation data transmission/reception unit 411*b* transmit the encoded evaluation data to the quality simulation device 301 (step S204).

According to the network quality estimated by the network quality estimation unit 311 at step S203, the network simulation unit 340 deteriorates the evaluation data transmitted from the evaluation device 401*a* and outputs the data to the evaluation device 401*b*, and deteriorates the evaluation data transmitted from the evaluation device 401*b* and outputs the data to the evaluation device 401*a* (step S205).

In the evaluation device 401*a*, the evaluation data transmission/reception unit 411*a* receives the transmitted evaluation data, and the evaluation data encoding/decoding unit 421*a* decodes the evaluation data into a form capable of being evaluated by the evaluator and outputs the data. Further, in the evaluation device 401*b*, the evaluation data transmission/reception unit 411*b* receives the transmitted evaluation data, and the evaluation data encoding/decoding unit 421*b* decodes the evaluation data into a form capable of being evaluated by the evaluator and outputs the data (step S206).

In the exemplary embodiment, as the quality estimation unit 311 is adapted to estimate the network quality when communications are performed between the specified evaluation points, and the network quality simulation unit 340 is adapted to deteriorate the evaluation data according to the estimated network quality and transmits the data to a plurality of evaluation devices for evaluating the communication quality, the evaluation data is transmitted and received between a plurality of evaluation devices, enabling to perform evaluation of communication quality in a dialogue form.

Third Exemplary Embodiment

A third exemplary embodiment of the invention will be described with reference to the drawings. FIG. 7 is a block diagram showing the configuration of the third exemplary embodiment of the communication quality evaluation system according to the present invention.

As shown in FIG. 7, the communication quality evaluation system of the third exemplary embodiment includes a control device 800 which controls a map/layout diagram display device 100, a position specifying device 200, and a map/layout diagram database (DB) 120, which are connected to the control device, and a quality simulation device 302 which transmits evaluation data to the evaluation device 401*c* and transmits evaluation data to a terminal 401*d* via an actual system 500. Note that description will be given based on the premise that the evaluation device 401*c* and the terminal 401*d* are mobile telephones, and the actual system 500 is a mobile telephone communication system.

Although the communication quality evaluation system of the first exemplary embodiment and the communication quality evaluation system of the second exemplary embodiment estimate the network quality at an evaluation point and simulate the evaluation data according to the estimated network quality, the communication quality evaluation system of the third exemplary embodiment simulates evaluation data according solely to the radio wave environment at an evaluation point, and reproduces the network quality by applying the evaluation data to an actual system. This enables to perform communication quality evaluation in the actual traffic situation.

Note that the configurations of the map/layout diagram display device 100 and the position specifying device 200, and specific examples of the devices are the same as those shown in the description of the first exemplary embodiment.

The quality simulation device 302 includes a radio wave environment estimation unit 312, an evaluation data transmission/reception unit 322, and a radio wave environment simulation unit (quality simulation unit) 342. The radio wave environment estimation unit 312 has a function of estimating a radio wave environment between an evaluation point specified by the position specifying device 200 and a destination base station.

FIG. 8 is a block diagram showing an exemplary configuration of the radio wave environment estimation unit 312. As shown in FIG. 8, the radio wave environment estimation unit 312 includes a radio wave environment DB 312*b* in which radio wave environment data such as measured or estimated reception signal electric power and delay spread is stored while being associated with locations, and a radio wave environment extraction unit 312*a* which extracts radio wave environment data at an evaluation point specified by the position specifying device 200 from the radio wave environment DB 312*b*.

The evaluation data transmission/reception unit 322 has a function of receiving transmitted evaluation data from the actual system 500, and transmitting evaluation data output from the radio wave environment simulation unit 342 to the actual system 500.

The radio wave environment simulation unit 342 has a function of deteriorating evaluation data output from the evaluation data transmission/reception unit 322 according to the radio wave environment estimated by the radio wave environment estimation unit 312 and transmitting the data to the evaluation device 401c, and a function of deteriorating evaluation data transmitted from the evaluation device 401a according to the radio wave environment estimated by the radio wave environment estimation unit 312 and outputting the data to the evaluation data transmission/reception unit 322. Deteriorating evaluation data specifically means to cause signal power attenuation, multi-path delay, and the like in the evaluation data.

The evaluation device 401c includes an evaluation data transmission/reception unit 411c and an evaluation data encoding/decoding unit 421c. The evaluation data transmission/reception unit 411c has a function of receiving evaluation data transmitted from the quality simulation device 302, and transmitting evaluation data encoded by the evaluation data encoding/decoding unit 421c to the quality simulation device 302.

The evaluation data encoding/decoding unit 421c has a function of decoding evaluation data received by the evaluation data transmission/reception unit 411c into a form capable of being evaluated by an evaluator and outputting the data, and a function of encoding evaluation data generated by an evaluator. Note that a specific example of the evaluation device 401c is the same as the example of the evaluation device 400 shown in the description of the first exemplary embodiment.

The actual system 500 which is a communication system of an evaluation object includes an evaluation data transmission/reception unit 510, a network control device 520, a communication network 530, a network control device 540, and an evaluation data transmission/reception unit 550.

The evaluation data transmission/reception unit 510 has a function of transmitting evaluation data received over the communication network to the quality simulation device 302, and a function of receiving evaluation data transmitted from the quality simulation device 302 and transmitting the data to the terminal 401d over the communication network 530. The network control device 520 is a device having a function of relaying aggregated data to the communication network 530. Specifically, the network control device 520 is an RNC (Radio Network Controller) in a mobile telephone system, for example.

The network control device 520 is provided for each limited area, and evaluation data received by the evaluation data transmission/reception unit 510 is transmitted to the network control device 520 according to the evaluation point specified by the position specifying device 200.

The communication network 530 is a backbone network of the actual system 500. The network control device 540 is a network control device corresponding to the position of a counterpart with which the evaluator communicates. The evaluation data transmission/reception unit 550 is a base station provided at a position corresponding to the position of a counterpart with which the evaluator communicates.

It is preferable that communications between the quality simulation device 302 and the actual system 500 are performed without virtually deteriorating evaluation data, which means evaluation data will not be deteriorated to the same or worse level than that deteriorated in the quality simulation device 302, for example.

For example, in the case where evaluation data is deteriorated by −60 dB as a propagation loss by the radio wave environment simulation unit 342 of the quality simulation device 302, and when a propagation loss in communications between the quality simulation device 302 and the actual system 500 is −1 dB, the propagation loss in communications between the quality simulation device 302 and the actual system 500 is smaller to the negligible extent than the deterioration (−60 dB) applied in the quality simulation device 302. As such, it can be said that communications are performed without virtually deteriorating the quality of the evaluation data between the quality simulation device 302 and the actual system 500.

If deterioration of the evaluation data is unavoidable in communications between the quality simulation device 302 and the actual system 500, the radio wave environment simulation unit 342 may deteriorate evaluation data while considering the radio wave environment estimated by the radio wave environment estimation unit 312 and deterioration of evaluation data by the communications between the quality simulation device 302 and the actual system 500. Specifically, in the case of the above example, it is preferable that the radio wave environment simulation unit 342 deteriorates the evaluation data by −59 dB and outputs it.

The terminal 401d is a communication terminal used by the counterpart whom the evaluator communicates with, including an evaluation data transmission/reception unit 411d and an evaluation data encoding/decoding unit 421d. The evaluation data transmission/reception unit 411d has a function of receiving transmitted evaluation data from the actual system 500 and a function of transmitting evaluation data encoded by the data encoding/decoding unit 421d to the actual system 500. The evaluation data encoding/decoding unit 421d has a function of decoding and outputting evaluation data received by the evaluation data transmission/reception unit 411d, and a function of encoding evaluation data generated by the evaluator.

Note that a specific exemplary device of the terminal 401d is the same as the example of the evaluation device 400 shown in the description of the first exemplary embodiment.

FIG. 9 is a flowchart schematically showing the operation of the third exemplary embodiment of the communication quality evaluation system according to the present invention.

First, the control device 800 extracts map data or layout diagram data corresponding to the area specified by an evaluator among map data or layout diagram data stored in the map/layout diagram DB 120, from the map/layout diagram DB 120, and displays the map or the layout diagram of the area on the map/layout diagram display device 100 (step S301).

Next, when the position specifying device 200 is operated and an evaluation point is specified, the control device 800 acquires position data indicating the evaluation point designated by the position specifying device 200 within the area of the map or layout diagram displayed on the map/layout diagram display device 100 (step S302). Further, the radio wave environment estimation unit 312 estimates a radio wave environment when communications are performed at the evaluation point specified at step S301 (step S303).

The evaluation data transmission/reception unit 322 of the quality simulation device 302 receives evaluation data transmitted from the actual system 500 (step S304). Then, the radio wave environment simulation unit 342 of the quality simulation device 302 deteriorates the evaluation data received by the evaluation data transmission/reception unit 322 at step S304, according to the radio wave environment estimated at step S303 (step S305).

Further, the radio wave environment simulation unit 342 transmits evaluation data deteriorated at step S305 to the evaluation device 401c. The evaluation device 401c receives the evaluation data transmitted by the evaluation data transmission/reception unit 411c, and the evaluation data encoding/decoding unit 421c decodes the evaluation data into a form capable of being evaluated by an evaluator and outputs the data (step S306).

The evaluation data encoding/decoding unit 421c of the evaluation device 401c encodes evaluation data generated by the evaluator. The evaluation data transmission/reception unit 411c transmits the encoded evaluation data to the quality simulation device 302 (step S307).

The radio wave environment simulation unit 342 of the quality simulation device 302 deteriorates the evaluation data transmitted at step S307 according to the radio wave environment estimated at step S303 (step S308).

Further, the radio wave simulation unit 342 transmits the evaluation data deteriorated at step S308 to the terminal 401d via the actual system 500 (step S309). In the terminal 401d, the evaluation data transmission/reception unit 411d receives the transmitted evaluation data, and the evaluation data encoding/decoding unit 421d decodes the evaluation data into a form capable of being evaluated by the evaluator and outputs the data (step S310).

In the exemplary embodiment, as the quality simulation unit is adapted to deteriorate evaluation data according to the estimated radio wave environment and transmit the data to the evaluation device via the communication system which is actually operated, communication quality evaluation can be performed in the actual traffic state and radio wave environment.

Fourth Exemplary Embodiment

A fourth exemplary embodiment of the invention will be described with reference to the drawings. FIG. 10 is a block diagram showing the configuration of the fourth exemplary embodiment of the communication quality evaluation system according to the present invention.

As shown in FIG. 10, the communication quality evaluation system of the fourth exemplary embodiment includes a control device 800 which controls a map/layout diagram display device 100, a position specifying device 200, and a map/layout diagram DB 120 which are connected to the control device, and a quality simulation device 303 which transmits evaluation data to an evaluation device 400.

Although the communication quality evaluation system of the first exemplary embodiment, the communication quality evaluation system of the second exemplary embodiment, and the communication quality evaluation system of the third exemplary embodiment deteriorate evaluation data according to the network quality at a specified evaluation point and the estimation result of the radio wave propagation environment, the communication quality evaluation system of the fourth exemplary embodiment stores multiple pieces of deteriorated evaluation data beforehand in the evaluation DB 323, and according to the network quality estimation result, extracts evaluation data closest to the estimation result from the evaluation DB 323, and transmits the data to the evaluation device 400.

In other words, the evaluation DB 320 shown in FIG. 1 stores evaluation data to which deterioration processing has not been applied, and the evaluation DB 323 shown in FIG. 10 stores evaluation data to which deterioration processing has been applied.

Note that the configurations of the map/layout diagram display device 100 and the position specifying device 200 and specific exemplary devices thereof are the same as those shown in the description of the first exemplary embodiment.

The quality simulation device 303 includes a network quality estimation unit 310, an evaluation DB 323, and an evaluation data extraction unit (quality simulation unit) 343. The function of the network quality estimation unit 310 is the same as that shown in the description of the first exemplary embodiment.

In the evaluation DB 323, evaluation data deteriorated according to the network quality is stored while being associated with locations. The evaluation data deteriorated according to the network quality is evaluation data to which deterioration processing due to the network quality is applied. In the case of evaluation data to be used for sound communications, the evaluation data may be data subjected to sound interruption, delay, session interruption, response deterioration, noise increase, and the like. Specifically, in the evaluation DB 323, sound data with the delay amount of 0.5 second, and voice data with the delay amount of 1.0 second are stored, for example.

The evaluation data extraction unit 343 has a function of extracting evaluation data closest to the estimation result from the evaluation DB 323 according to the network quality estimated by the network quality estimation unit 310, and a function of transmitting the extracted evaluation data to the evaluation device 400.

Description will be given for operation of extracting evaluation data closest to the estimation result from the evaluation DB 323 by the evaluation data extraction unit 343 according to the network quality estimated by the network quality estimation unit 310.

In the evaluation DB, evaluation data of the delay amount of 0.5 second and evaluation data of the delay amount of 1.0 second are stored. In the network quality estimation unit 310, when it is estimated that the delay amount is 0.53 second, the evaluation data extraction unit 343 extracts sound data of the delay amount of 0.5 second, having the smallest difference from the estimated delay amount (0.53 second), from the evaluation DB 323.

Note that the configuration and the specific exemplary device of the evaluation device 400 are the same as those of the evaluation device 400 shown in the description of the first exemplary embodiment.

FIG. 11 is a flowchart schematically showing the operation of the fourth exemplary embodiment of the communication quality evaluation system according to the present invention.

First, the control device 800 extracts map data or layout diagram data corresponding to an area specified by an evaluator among map data or layout diagram data stored in the map/layout diagram DB 120, from the map/layout diagram DB 120, and displays the map or the layout diagram of the area on the map/layout diagram display device 100 (step S401).

Next, when the position specifying device 200 is operated and an evaluation point is specified, the control device 800 acquires position data indicating the evaluation point specified by the position specifying device 200 within the area of the map or the layout diagram displayed on the map/layout diagram display device 100 (step S402). Further, the network quality estimation unit 310 estimates the network quality when communications are performed at the evaluation point specified at step S402 (step S403).

According to the network quality estimated at step S403, the evaluation data extraction unit 343 extracts evaluation data closest to the estimation result from the evaluation DB 323 (step S404). Next, the evaluation data extraction unit 343 transmits the evaluation data extracted at step S404 to the evaluation device 400 (step S405). In the evaluation device 400, the evaluation data reception unit 410 receives the transmitted evaluation data, and the evaluation data decoding unit 420 decodes the evaluation data into a form capable of being evaluated by the evaluator and outputs the data (step S406).

As the exemplary embodiment is configured to have the evaluation DB in which the evaluation data is applied with deterioration processing due to the network quality while being associated with locations, it is possible to perform communication quality evaluation without having a unit for performing processing to deteriorate the evaluation data.

Fifth Exemplary Embodiment

A fifth exemplary embodiment of the invention will be described with reference to the drawings. FIG. 12 is a block diagram showing the configuration of the fifth exemplary embodiment of the communication quality evaluation system according to the present invention.

As shown in FIG. 12, the communication quality evaluation system of the fifth exemplary embodiment includes a control device 800 which controls a map/layout diagram display device 100, a position specifying device 200, and a map/layout diagram database (DB) 120 which are connected to the control device, a quality simulation device 300 which deteriorates and transmits evaluation data to the evaluation device 400, and an environmental noise generation device 600 which transmits environmental noise data to the environmental noise playback device 700.

As the communication quality evaluation system of the fifth exemplary embodiment plays back environmental noises of a specified evaluation point, it is possible to perform quality evaluation while considering the environmental noises when quality evaluation of sound communications is performed at a location having large environmental noises such as a busy street.

Note that the configurations and the specific examples of devices of the map/layout diagram display device 100, the position specifying device 200, the quality simulation device 300, and the evaluation device 400 are the same as those described in the first exemplary embodiment.

The environmental noise generation device 600 includes an environmental noise DB 610, an environmental noise data extraction unit 620, and an environmental noise data transmission unit 630. In the environmental noise DB 610, environmental noise data which is sound data corresponding to volumes and types of environmental noises (engine noises of automobiles, engine noises of airplanes, human voices, sounds for advertisements, etc.) is stored while being associated with locations.

The environmental noise data extraction unit 620 has a function of extracting environmental noise data corresponding to the evaluation point specified by the position specifying device 200, from the environmental noise DB 610. The environmental noise data transmission unit 630 has a function of transmitting the environmental noise data extracted by the environmental noise data extraction unit 620 to the environmental noise playback device 700.

The environmental noise playback device 700 includes an environmental noise data reception unit 710 and an environmental noise data decoding unit (environmental noise playback unit) 720. The environmental noise data reception unit 710 has a function of receiving environmental noise data transmitted from the environmental noise generation device 600. The environmental noise data decoding unit 720 has a function of decoding the environmental noise data received by the environmental noise data reception unit 710 and outputting (playing back) the environmental noise.

The environmental noise playback device 700 is provided near an evaluator and the evaluation device 400, for example, and then, evaluation is performed by the evaluator corresponding to the environmental noise output from the environmental noise playback device 700 and sounds output by the evaluation device 400 based on the evaluation data.

FIG. 13 is a flowchart schematically showing the operation of the fifth exemplary embodiment of the communication quality evaluation system according to the present invention.

First, the control device 800 extracts map data or layout diagram data corresponding to an area specified by the evaluator, among map data or layout diagram data stored in the map/layout diagram DB 120, from the map/layout diagram DB 120, and displays the map or the layout diagram of the area on the map/layout diagram display device 100 (step S501).

Next, when the position specifying device 200 is operated and an evaluation point is specified, the control device 800 acquires position data indicating the evaluation point specified by the position specifying device 200 within the area of the map or the layout diagram displayed on the map/layout diagram display device 100 (step S502). Further, the network quality estimation unit 310 estimates the network quality when communications are performed at the evaluation point specified at step S502 (step S503).

The network quality simulation unit 340 extracts evaluation data from the evaluation DB 320 (step S504). Next, the network quality simulation unit 340 deteriorates the evaluation data extracted at step S504 according to the network quality estimated by the network quality estimation unit 310 at step S503 (step S505), and transmits the data to the evaluation device 400. The evaluation device 400 receives the evaluation data deteriorated at step S505, decodes the data into a form capable of being evaluated by the evaluator, and outputs the data (step S506).

Further, the environmental noise data extraction unit 620 of the environmental noise generation device 600 extracts environmental noise data corresponding to the evaluation point specified at step S502 from the environmental noise DB 610, and outputs the data to the environmental noise data transmission unit 630. The environmental noise data transmission unit 630 transmits the environmental noise data extracted from the environmental noise DB 610 to the environmental noise playback device 700.

The environmental noise data reception unit 710 of the environmental noise playback device 700 receives the transmitted environmental noise data and outputs the data to the environmental noise data decoding unit 720. The environmental noise data decoding unit 720 decodes and outputs the environmental noise data (step S508).

In the exemplary embodiment, as the environmental noise playback device 700 is configured to output an environmental noise corresponding to the evaluation point, it is possible to evaluate communication quality while considering the environmental noises corresponding to a situation where sound communications are performed at a location where environmental noises are large such as a busy street.

Note that although, in the communication quality evaluation system of the fifth exemplary embodiment shown in FIG. 12, a device for generating (extracting) environmental noise data and a device for playing back environmental noises are added to the communication quality evaluation system of the first exemplary embodiment shown in FIG. 1, it is acceptable to add a device for generating (extracting) environmental noise data and a device for playing back environmental noises to the communication quality evaluation systems of the second to fourth exemplary embodiments.

Further, in the communication quality evaluation system of the first to fifth exemplary embodiments, the quality simulation device, the map/layout diagram DB, and the environmental noise generation device may be incorporated in the same or different server systems respectively. Further, the map/layout diagram display device, the position specifying device, the evaluation device, and the environmental noise playback device may be incorporated in a client system.

With such a configuration, as a plurality of evaluators operating the client system specify positions (evaluation points) within the display range of the map/layout diagram display device, it is possible to realize a new service of providing an evaluation device with the communication quality at the positions. Note that the quality simulation device and the evaluation device are preferably connected with each other via a communication network in which quality of the evaluation data will not be deteriorated or the level of quality degradation will be low.

First Example

Next, operation of the best mode for carrying out the present invention will be described using specific examples. In a first example, description will be given for the case where an evaluator evaluates sound quality of a mobile phone system using the communication quality evaluation system of the first exemplary embodiment shown in FIG. 1.

Further, it is assumed that a TFT display is used as the map/layout diagram display device 100 of the communication quality evaluation system according to the first exemplary embodiment of the invention, a mouse device is used as the position specifying device 200, and as the quality simulation device 300, a server main body is used, which includes a hard disk device incorporating the evaluation DB 320, a CPU which controls operations of the network quality estimation unit 310 and the network quality simulation unit 304 and the like, and a communicating function of wireless LAN for transmitting evaluation data to the evaluation device 400, and as the evaluation device 400, a mobile telephone terminal having a communicating function of wireless LAN to communicate with the quality simulation device 300 is used.

Operation of the communication quality evaluation system of the first example will be described. First, when an evaluator operates the mouse device and specifies a desired evaluation area on a map or a layout diagram with the address or a range selection of a wide area diagram, map data or layout diagram data of the specified area is displayed on the map/layout diagram display.

Then, when the evaluator operates the mouse device and specifies a position (evaluation point) for evaluating communication quality within the display range on the map/layout diagram display, the server acquires position data of the evaluation point. Next, the quality simulation server (quality simulation device 300) estimates a packet loss rate and an amount of delay, for example, as network quality when communications are performed at the evaluation point. Further, the quality simulation server extracts sound data from the evaluation DB 320, and deteriorates the sound data so as to cause packet loss and delay in the extracted sound data according to the estimated network quality.

The quality simulation server transmits the deteriorated sound data to the mobile telephone terminal. When receiving the deteriorated sound data, the mobile telephone terminal decodes the received sound data and outputs the sound. The evaluator listens to the sound data output from the mobile telephone terminal and evaluates the sound quality.

Second Example

In a second example, description will be given for the case where an evaluator evaluates sound quality of a mobile telephone system using the communication quality evaluation system of the second exemplary embodiment shown in FIG. 5.

In the communication quality evaluation system of the second example, it is assumed that mouse devices are used as the position specifying device 201a and the position specifying device 201b, and mobile telephone terminals are used as the evaluation device 401a and the evaluation device 401b.

Operation of the communication quality evaluation system of the second example will be described. First, when an evaluator operates a mouse device so as to specify a desired evaluation area on a map or a layout diagram with the address or a range selection of a wide area diagram, map data or layout diagram data of the specified area is displayed on the map/layout diagram display.

Then, when two evaluators operate respective mouse devices so that two positions (evaluation points) for evaluating communication quality are specified within the display range of the map/layout diagram display, the server (control device 800) acquires position data of the two evaluation points. Then, the quality simulation server (quality simulation device 301) estimates a packet loss rate and an amount of delay, for example, as network quality when communications are performed between the two evaluation points.

Further, the quality simulation server deteriorates sound data such that packet loss and delay are caused in the sound data transmitted from one mobile telephone terminal, according to the estimated network quality. To the other mobile telephone terminal, deteriorated sound data is transmitted, and the other mobile telephone terminal decodes the data. The evaluator using the other mobile telephone terminal evaluates the sound quality while talking with the evaluator using the one mobile telephone terminal.

Third Example

In the third example, description of be given for operation when an evaluator evaluates sound quality of a mobile telephone system using the communication quality evaluation system of the third exemplary embodiment shown in FIG. 7.

First, when an evaluator operates a mouse device (position specifying device 200) and specifies a desired evaluation area on a map or a layout diagram with the address or range selection of a wide area diagram, map data or layout diagram data of the specified area is displayed on the map/layout diagram display.

Then, when the evaluator operates the mouse device and specifies a position (evaluation point) for evaluating communication quality within the display range on the map/layout diagram display, the server (control device 800) acquires position data of the evaluation point. Next, the quality simulation server (quality simulation device 302) estimates signal electric power attenuation and multi-path delay, for example, as radio wave environments when communications are performed at the evaluation point.

When the mobile telephone terminal for evaluation (evaluation device 401c) makes a call to the terminal 401d in accordance with operation by the evaluator, the quality simulation server deteriorates sound data transmitted from the mobile telephone terminal so as to cause signal receiving electric power and multi-path delay according to the estimated radio wave environments, and transmits the data to the terminal 401d via the actual system 500. On the other hand, sound data generated in the counterpart terminal 401d is transmitted to the quality simulation device 302 via the actual system 500, and is deteriorated such that signal receiving electric power and multi-path delay are caused according to the estimated radio wave environments.

The mobile telephone terminal for evaluation receives the deteriorated sound data and decodes and outputs the data. The evaluator evaluates the sound quality while talking with the counterpart on the telephone connected over the communication network of the actual system.

Fourth Example

In a fourth example, description will be given for the case where an evaluator evaluates sound quality of a mobile telephone system using the communication quality evaluation system of the fourth exemplary embodiment shown in FIG. 10.

Operation of the communication quality evaluation system of the fourth example will be described. First, when an evaluator operates a mouse device (position specifying device 200) and specifies a desired evaluation area on a map or a layout diagram with the address or range selection of a wide area diagram, map data or layout diagram data of the specified area is displayed on the map/layout diagram display (map/layout diagram display device 100).

Then, when the evaluator operates the mouse device and specifies a position (evaluation point) for evaluating communication quality within the display range on the map/layout diagram display, the server (control device 800) acquires position data of the evaluation point. Next, the quality simulation server (quality simulation device 303) estimates a packet loss rate and an amount of delay, for example, as network quality when communications are performed at the evaluation point.

Further, the quality simulation server extracts evaluation data closest to the estimation result from the evaluation DB 323, and transmits the data to a mobile telephone terminal (evaluation device 400). The mobile telephone terminal receives the deteriorated sound data, and decodes the data. The evaluator listens to the sound data using the mobile telephone terminal, and evaluates the sound quality.

Fifth Example

In a fifth example, description will be given for the case where an evaluator evaluates sound quality of a mobile telephone system using the communication quality evaluation system of the fifth exemplary embodiment shown in FIG. 12.

Operation of the communication quality evaluation system of the fifth example will be described. First, when an evaluator operates a mouse device (position specifying device 200) and specifies a desired evaluation area on a map or a layout diagram with the address or range selection of a wide area diagram, map data or layout diagram data of the specified area is displayed on the map/layout diagram display (map/layout diagram display device 100).

Then, when the evaluator operates the mouse device and specifies a position (evaluation point) for evaluating communication quality within the display range on the map/layout diagram display, the server (control device 800) acquires position data of the evaluation point. Next, the quality simulation server (quality simulation device 300) estimates a packet loss rate and an amount of delay, for example, as network quality when communications are performed at the evaluation point. Further, the quality simulation server extracts sound data from the evaluation DB 320, and deteriorates the extracted sound data so as to cause packet loss and delay in the data according to the estimated network quality, and transmits the data to the mobile telephone terminal (evaluation device 400).

The mobile telephone terminal receives the deteriorated sound data, and decodes and output the sound data. Further, the environmental noise generation device 600 extracts environmental noise data of the evaluation point from the environmental noise DB 610, and transmits the data to the environmental noise playback device 700. The environmental noise playback device 700 receives the transmitted environmental noise data, decodes the received environmental noise data, and plays back the environmental noise. The evaluator listens to the sound data using a mobile telephone terminal in a state where the environmental noise of the evaluation point is simulated, and evaluates the sound quality.

In the exemplary embodiment, the control unit may specify a plurality of evaluation points for evaluating communication quality by an evaluator in accordance with an instruction by the evaluator within the display range of a map or a layout diagram displayed on a display unit, the quality estimation unit may estimate the network quality when communications are performed between the specified evaluation points, and the quality simulation unit may deteriorate, according to the network quality estimated by the quality estimation unit, evaluation data which is to be transmitted and received between a plurality of evaluation devices and is a sample of data to be transmitted and received actually in the communication system, and transmit the data to the plurality of evaluation devices for evaluating the communication quality.

In the exemplary embodiment, the quality estimation unit may estimate a radio wave environment when communications are performed at an evaluation point, and the quality simulation unit may deteriorate evaluation data to be used for evaluating communication quality according to the radio wave environment estimated by the quality estimation unit, and transmit the deteriorated evaluation data to an evaluation device via the communication system which is actually operated.

The evaluation data which is a sample of data to be transmitted and received actually in the communication system may be applied with deterioration processing due to the network quality, an evaluation database in which evaluation data is stored while being associated with locations may be provided, and the quality simulation unit may extract evaluation data from the evaluation database according to the network quality estimated by the quality estimation unit and transmit the data to the evaluation device.

It is also acceptable to include an environmental noise database for storing environmental noise data which is sound data of noises corresponding to locations where evaluation devices are used, an environmental noise data extraction unit which extracts environmental noise data from the environmental noise database, and an environmental noise playback unit which outputs sounds based on the environmental noise data extracted by the environmental noise data extraction unit.

In the exemplary embodiment, the quality estimation unit may include a radio wave environment database in which radio wave environment data indicating radio wave environments of respective locations is stored while being associated with the respective locations, a traffic database in which traffic data indicating amounts of traffic of respective locations is stored while being associated with the respective locations, and a quality parameter calculation unit which calculates quality parameters for estimating network quality, and the quality parameter calculation unit may extract radio wave environment data corresponding to an evaluation point from the radio wave environment database, extract traffic data corresponding to the evaluation point from the radio wave environment database, calculate a quality parameter corresponding to the extracted radio wave environment data and traffic data to thereby estimate the network quality of the evaluation point.

The quality estimation unit of the exemplary embodiment may include a quality database in which quality parameters for estimating the network quality are stored while being associated with locations, and a quality parameter extraction unit which extracts a quality parameter corresponding to the evaluation point from the quality database and estimates the network quality corresponding to the extracted quality parameter.

The quality estimation unit of the exemplary embodiment may include a radio wave environment database in which radio wave environment data indicating radio wave environments of respective locations is stored while being associated with the respective locations, and a radio wave environment extraction unit which extracts radio wave environment data corresponding to an evaluation point from the radio wave environment database, and estimates the network quality according to the extracted radio wave environment data.

The radio wave environment database may store radio wave environment data calculated by radio wave propagation estimation by means of a deterministic propagation estimation method.

As an evaluation device, a communication device used by a user may be used. Further, in the control unit, an evaluation point may be specified by an evaluator over a communication network, and the quality simulation unit may transmit evaluation data to the evaluation device over the communication network.

In the communication quality evaluation device of the exemplary embodiment, the quality estimation unit may estimate network quality when communications are performed between a plurality of evaluation points specified by an evaluator, the quality simulation unit may deteriorate, according to the network quality estimated by the quality estimation unit, evaluation data which is to be transmitted and received between a plurality of evaluation devices and is a sample of data to be transmitted and received in the communication system, and transmit the data to the plurality of evaluation devices for evaluating the communication quality.

In the communication quality evaluation device of the exemplary embodiment, the quality estimation unit may estimate radio wave environment in the case of performing communications at an evaluation point, and the quality simulation unit may deteriorate, according to the radio wave environment estimated by the quality estimation unit, evaluation data to be used for evaluating the communication quality, and transmit the deteriorated evaluation data to an evaluation device via the communication system which is actually operated.

The communication system may include an evaluation database in which evaluation data which is a sample of data to be transmitted and received actually in the communication system is applied with deterioration processing due to the network quality, and the quality simulation unit may extract evaluation data from the evaluation database according to the network quality estimated by the quality estimation unit and transmit the data to the evaluation device.

The quality estimation unit may include a radio wave environment database in which radio wave environment data indicating radio wave environments of respective locations is stored while being associated with respective locations, a traffic database in which traffic data indicating traffic volumes at respective locations is stored while being associated with the respective locations, and a quality parameter calculation unit which calculates quality parameters for estimating the network quality, and the quality parameter calculation unit may extract radio wave environment data corresponding to the evaluation point from the radio wave environment database, extract traffic data corresponding to the evaluation point from the traffic database, and calculate a quality parameter corresponding to the extracted radio wave environment data and traffic data to thereby estimate the network quality at the evaluation point.

The quality estimation unit may include a quality database in which quality parameters for estimating the network quality are stored while being associated with locations, and a quality parameter extraction unit which extracts a quality parameter corresponding to an evaluation point from the quality database and estimates the network quality according to the extracted quality parameter.

The quality estimation unit may include a radio wave environment database in which radio wave environment data indicating radio wave environments of respective locations is stored while being associated with the respective locations, and a radio wave environment extraction unit which extracts radio wave environment data corresponding to an evaluation point from the radio wave environment database and estimates the network quality according to the extracted radio wave environment data.

The radio wave environment database may store radio wave environment data calculated by radio wave propagation estimation using deterministic propagation estimation method.

As an evaluation device, a communication device used by a user may be used. Further, the quality simulation unit may transmit evaluation data to the evaluation device over the communication network.

A communication quality evaluation method of the exemplary embodiment may be configured such that in a control step, an evaluator specifies a plurality of evaluation points for evaluating communication quality within the display range of a map or a layout diagram displayed on the display unit in accordance with an instruction by the evaluator, and in a quality estimation step, network quality when communications are performed between the specified evaluation points is estimated, and in a quality simulation step, evaluation data which is data to be transmitted and received between a plurality of evaluation devices and is a sample of data to be transmitted and received actually in the communication system is deteriorated according to the network quality estimated in the quality estimation step and is transmitted to the plurality of evaluation devices for evaluating the communication quality.

It is also acceptable that in the quality estimation step, a radio wave environment when communications are performed at the evaluation point is estimated, and in the quality simulation step, evaluation data to be used for evaluating the communication quality is deteriorated and the deteriorated evaluation data is transmitted to the evaluation device via the communication system which is actually operated.

It is also acceptable that in the quality simulation step, evaluation data which is a sample of data to be transmitted and received actually in the communication system is applied with deterioration processing due to the network quality and is stored in the evaluation database while being associated with locations, and evaluation data is extracted from the evaluation database according to the network quality estimated in the quality estimation step and is transmitted to the evaluation device.

It is also acceptable to include an environmental noise data extraction step for extracting, corresponding to the specified evaluation point, environmental noise data which is sound data of noises corresponding to locations where the evaluation device is used from the environmental noise database in which the environmental noise data is stored while being associated with locations, and an environmental noise playback step for outputting sounds according to the environmental noise data extracted in the environmental noise data extraction step.

In the quality estimation step, it is acceptable to extract radio wave environment data corresponding to the evaluation point from the radio wave environment database in which radio wave environment data indicating radio wave environments of respective locations are stored while being associated with respective locations, extract traffic data corresponding to the evaluation point from the traffic database in which traffic data indicating the traffic volumes of respective locations are stored while being associated with respective locations, and estimate the network quality at the evaluation point according to the extracted radio wave environment data and traffic data.

In the quality estimation step, it is also acceptable to extract a quality parameter corresponding to the evaluation point from a quality database in which quality parameters for estimating the network quality are stored while being associated with locations, and estimate the network quality according to the extracted quality parameter.

In the quality estimation step, it is also acceptable to extract radio wave environment data corresponding to the evaluation point from the radio wave environment database in which radio wave environment data indicating radio wave environments of respective locations are stored while being associated with the respective locations, and estimate the network quality according to the extracted radio wave environment data.

In the quality simulation step, evaluation data may be transmitted to the evaluation device over the communication network.

Although the present invention has been described with reference to the embodiments (and examples), the present invention is not limited to the above-described embodiments (and examples). Various changes in form and details which are understood by those skilled in the art may be made within the scope of the present invention.

This application is based upon and claims the benefit of priority from Japanese patent application No. 2006-318769, filed on Nov. 27, 2006, the disclosure of which is incorporated herein in its entirety by reference.

INDUSTRIAL APPLICABILITY

The present invention is applicable for specifying problematic areas which is required to be coped with and for verifying the degree of quality improvement provided by changes in facilities and changes in design conditions, in equipment planning and design of communication networks of wireless communication systems such as mobile telephone communication networks.

BRIEF DESCRIPTION OF THE DRAWINGS

FIG. 13 is a flowchart schematically showing the operation of the fifth exemplary embodiment of the communication quality evaluation system.

Figure 1:
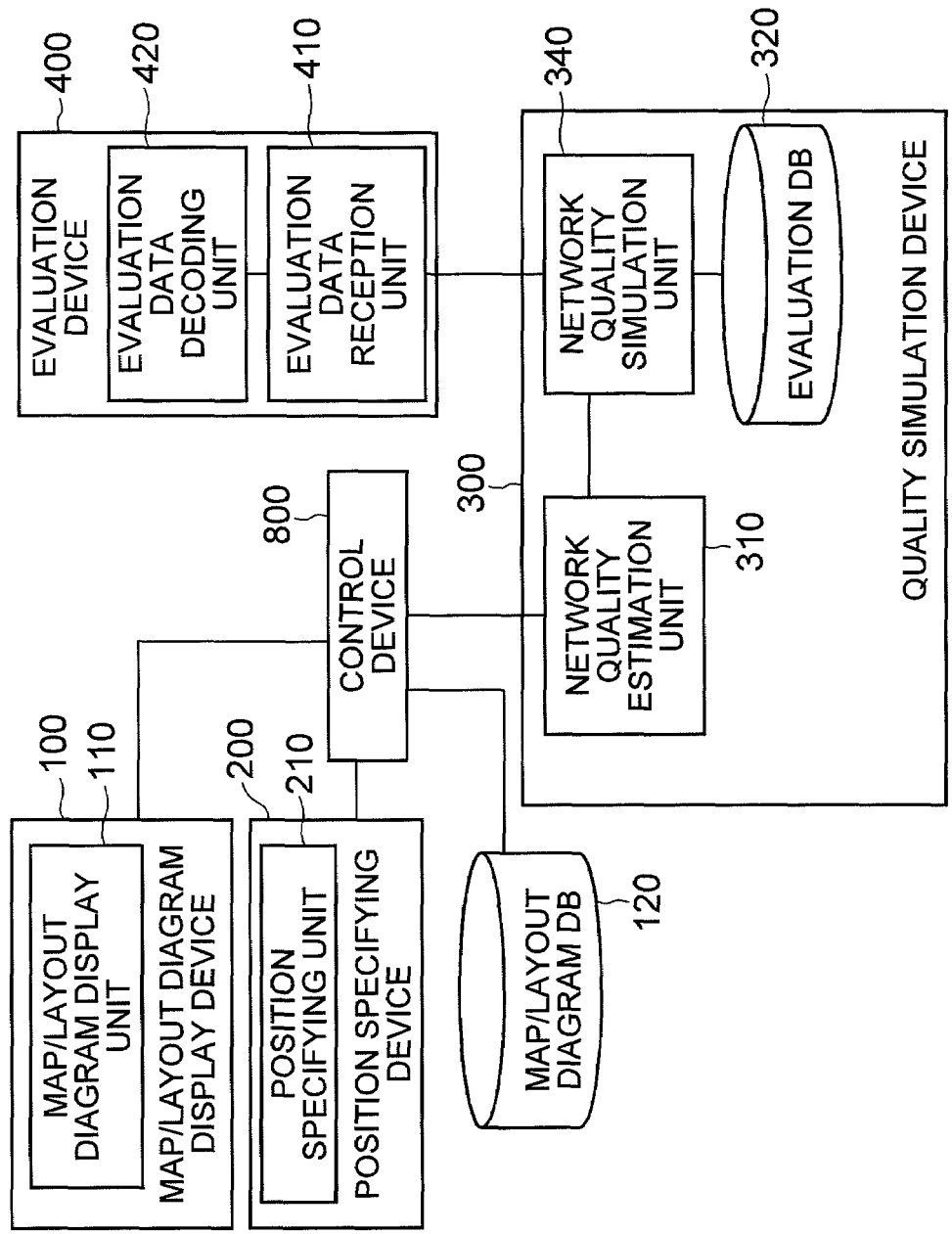
FIG. 1 is a block diagram showing the configuration of a first exemplary embodiment of a communication quality evaluation system.
Figure 2:
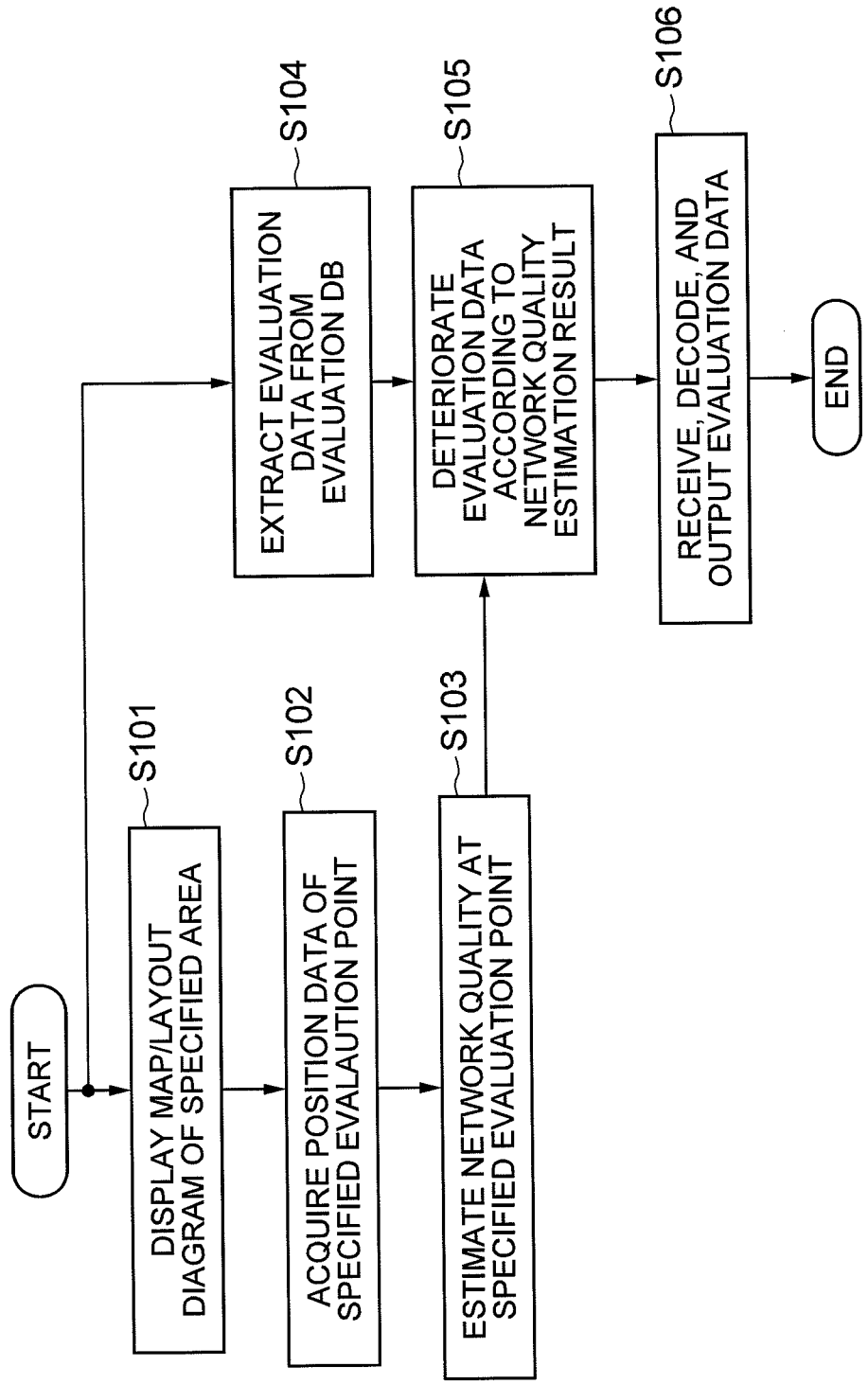
FIG. 2 is a flowchart schematically showing the operation of the first exemplary embodiment of the communication quality evaluation system.
Figure 3:
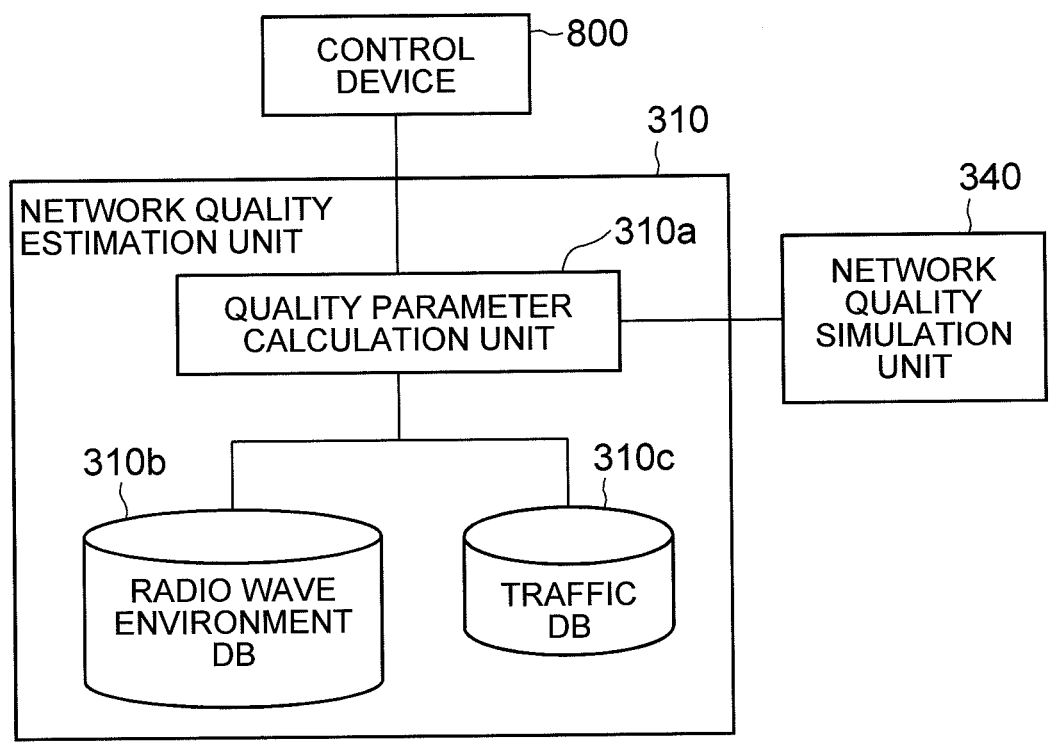
FIG. 3 is a block diagram showing an exemplary configuration of a network quality estimation unit which calculates a quality parameter using radio wave environment data and traffic data.
Figure 4:
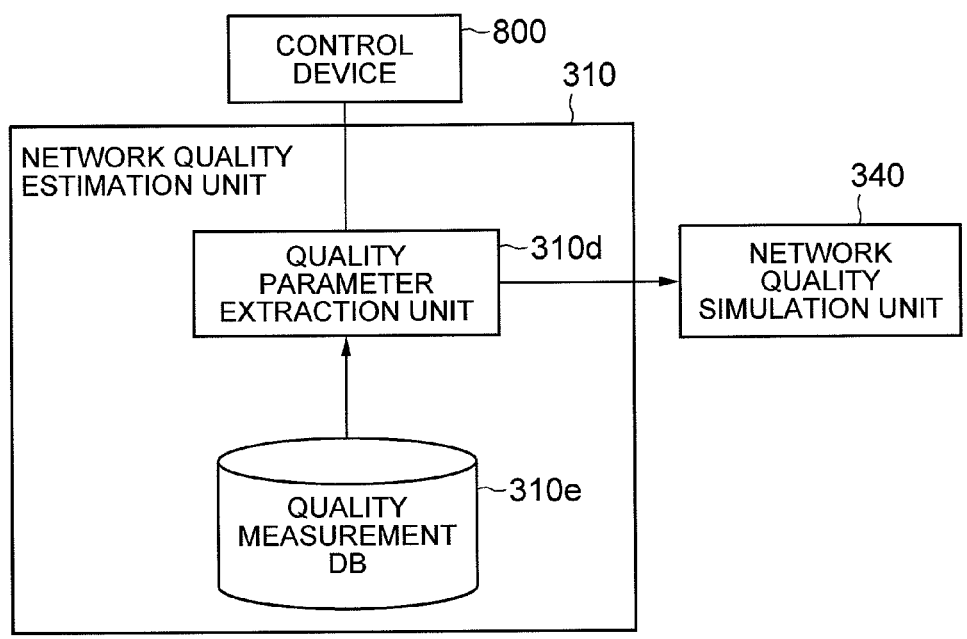
FIG. 4 is a block diagram showing an exemplary configuration of a network quality estimation unit which extracts an estimated quality parameter.
Figure 5:
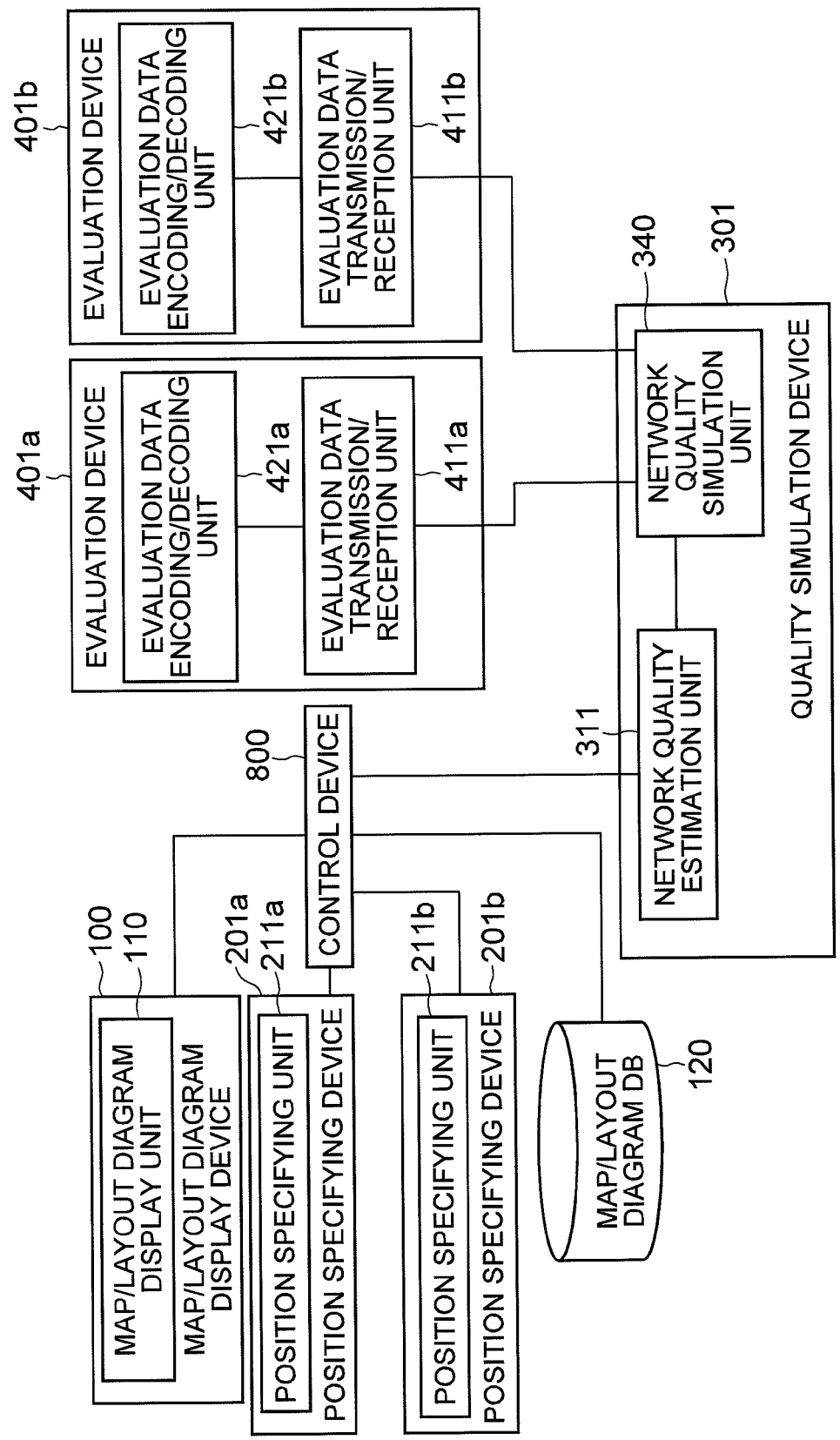
FIG. 5 is a block diagram showing the configuration of a second exemplary embodiment of a communication quality evaluation system.
Figure 6:
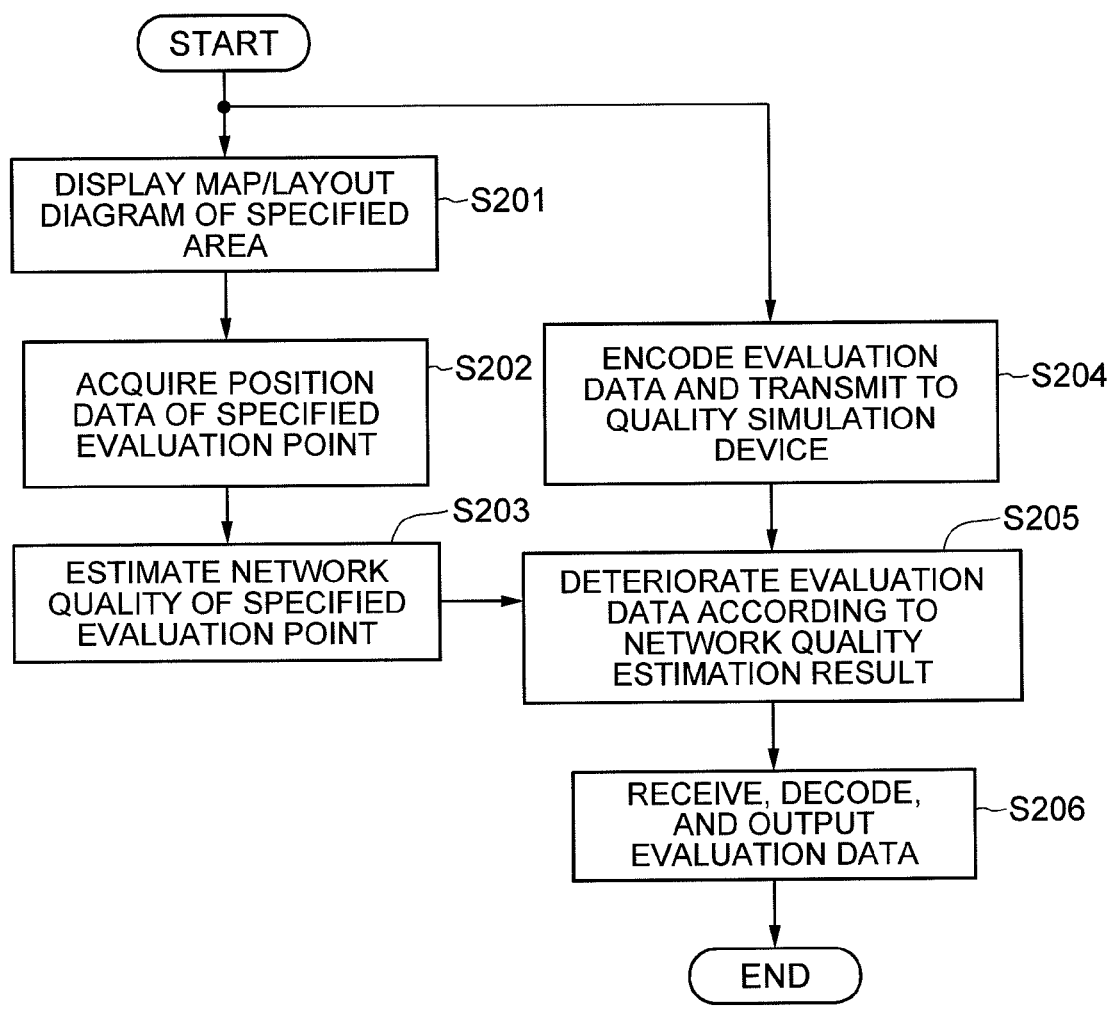
FIG. 6 is a flowchart schematically showing the operation of the second exemplary embodiment of the communication quality evaluation system.
Figure 7:
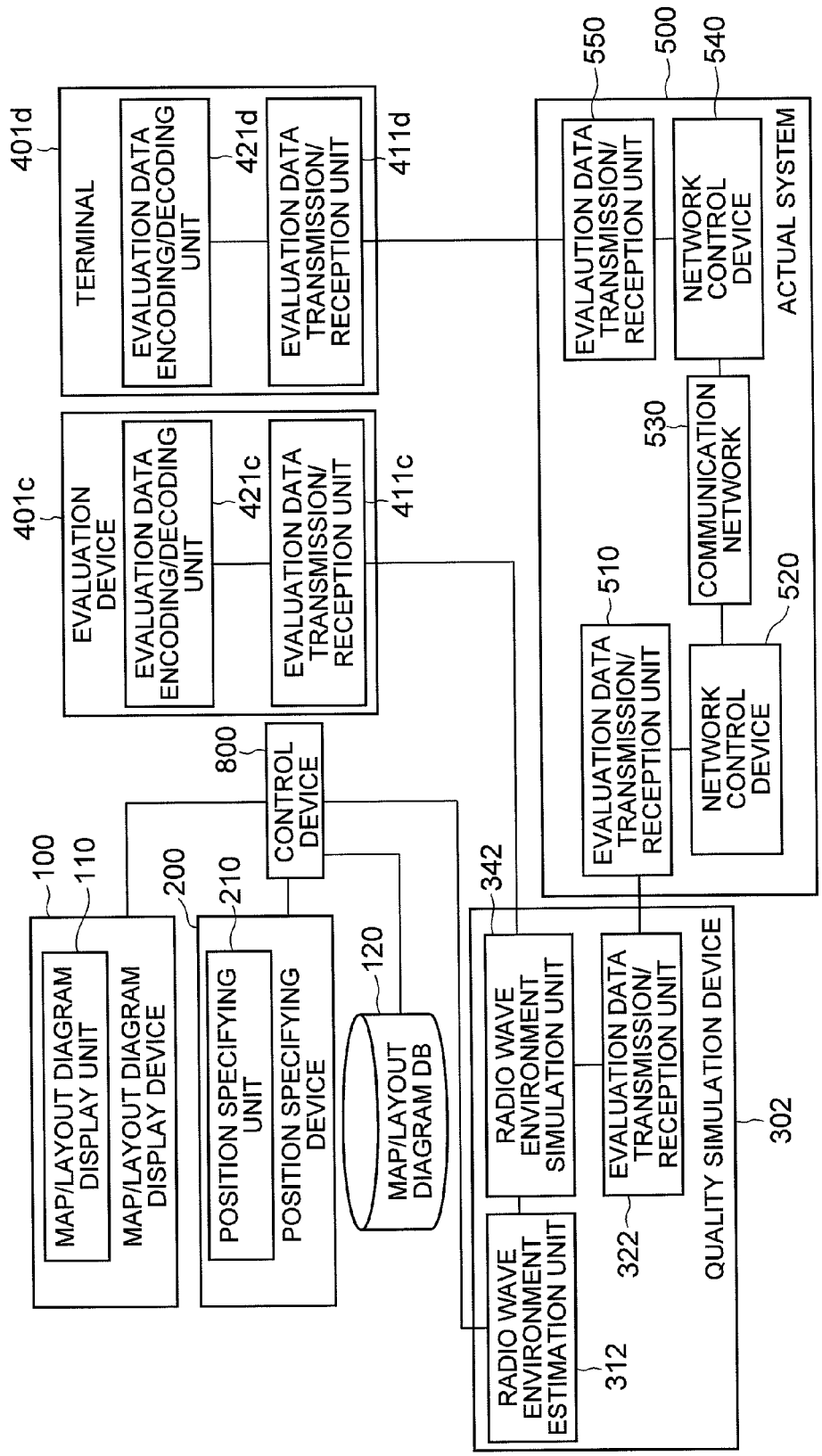
FIG. 7 is a block diagram showing the configuration of a third exemplary embodiment of a communication quality evaluation system.
Figure 8:
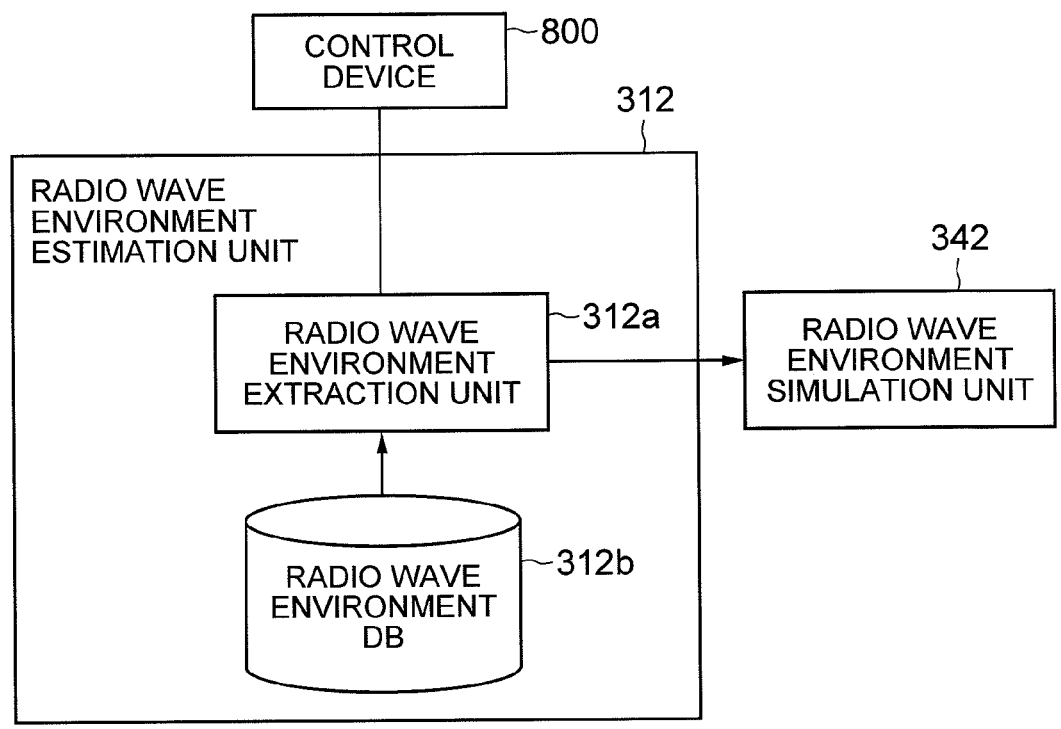
FIG. 8 is a block diagram showing an exemplary configuration of a radio wave environment estimation unit.
Figure 9:
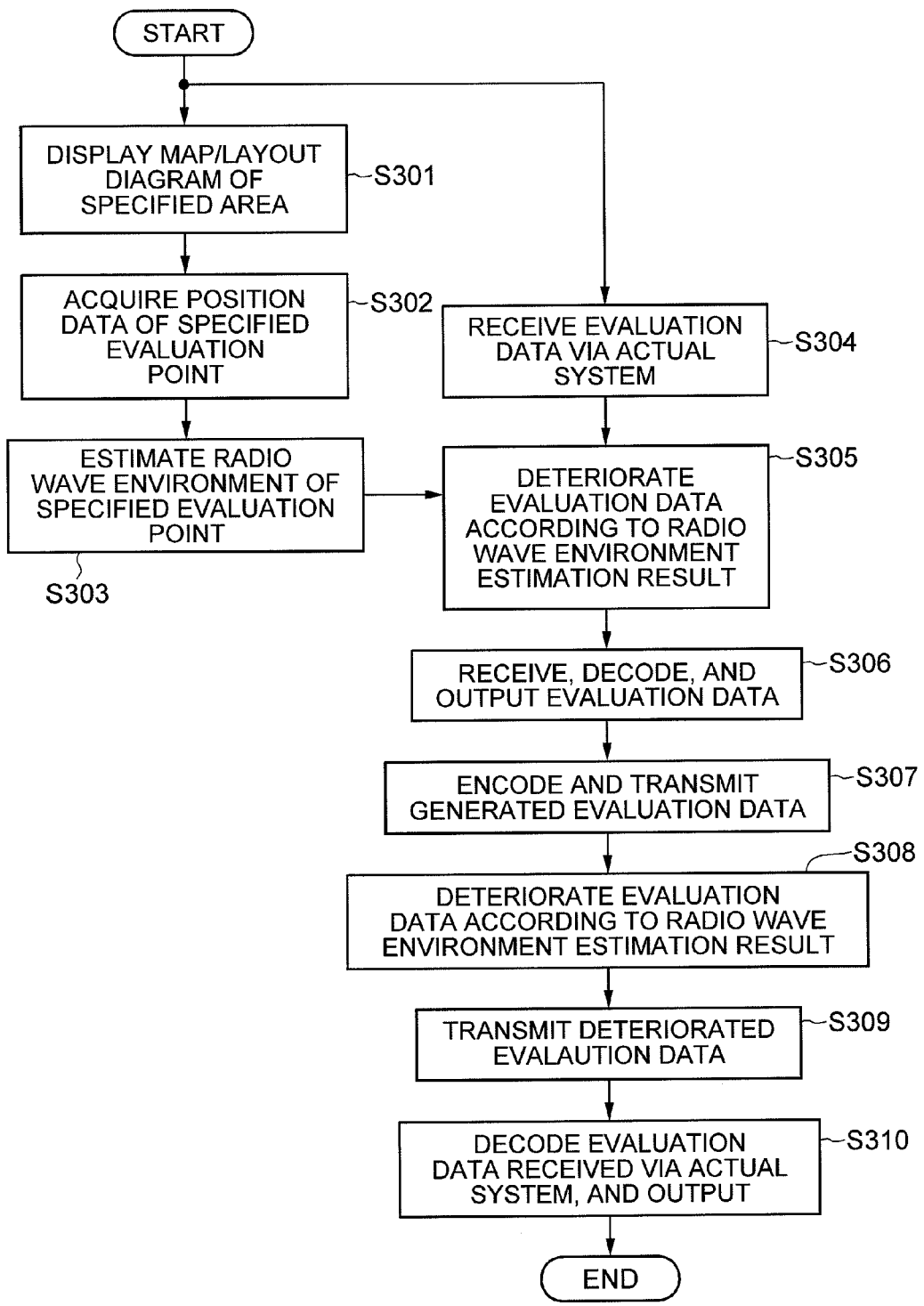
FIG. 9 is a flowchart schematically showing the operation of the third exemplary embodiment of the communication quality evaluation system.
Figure 10:
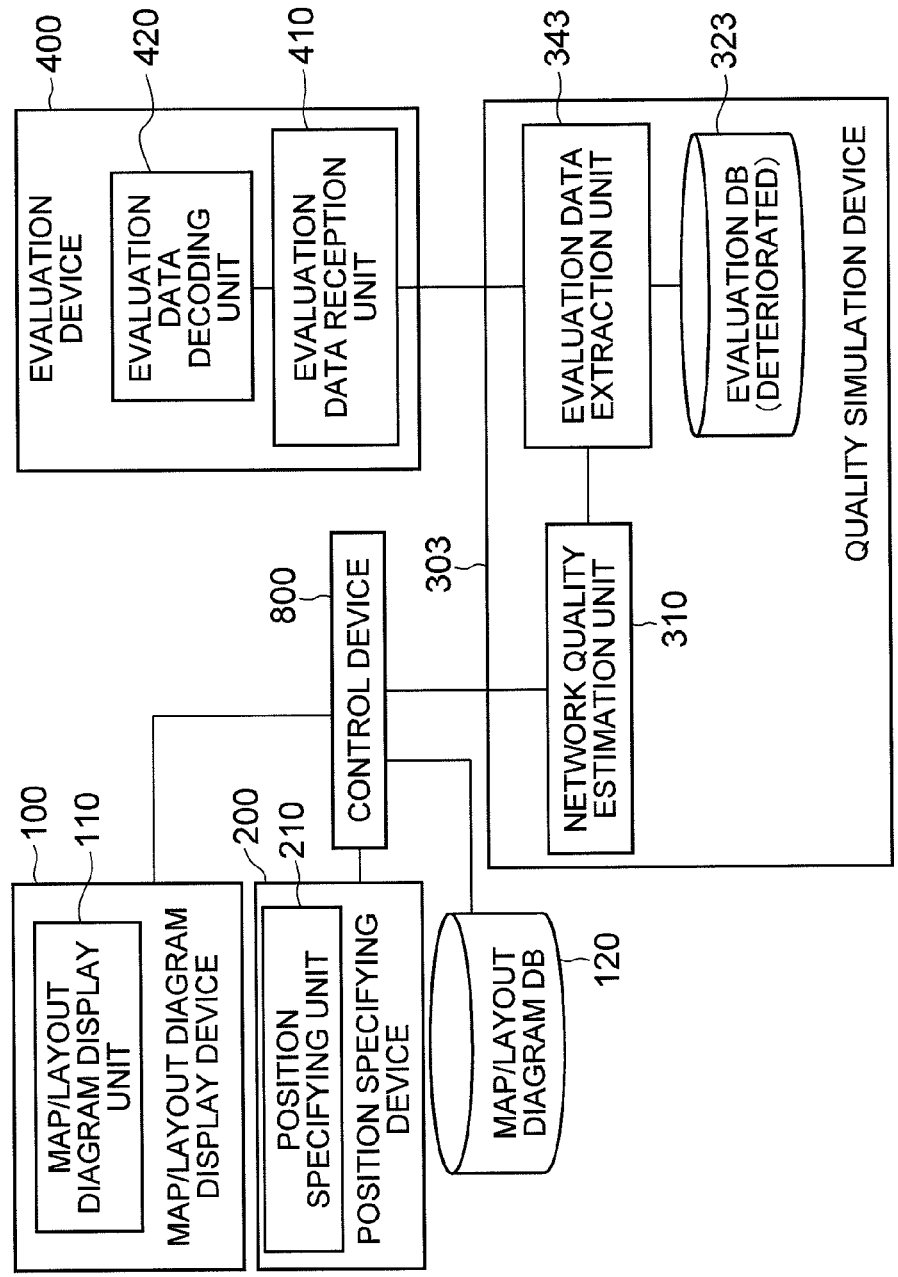
FIG. 10 is a block diagram showing the configuration of a fourth exemplary embodiment of a communication quality evaluation system.
Figure 11:
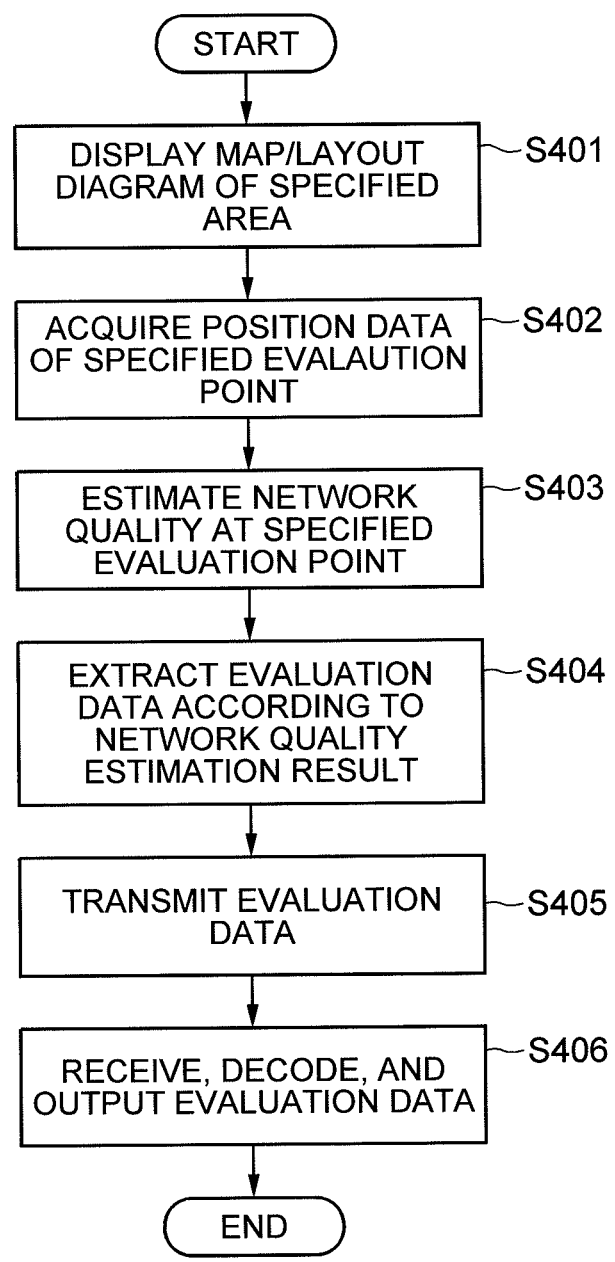
FIG. 11 is a flowchart schematically showing the operation of the fourth exemplary embodiment of the communication quality evaluation system.
Figure 12:
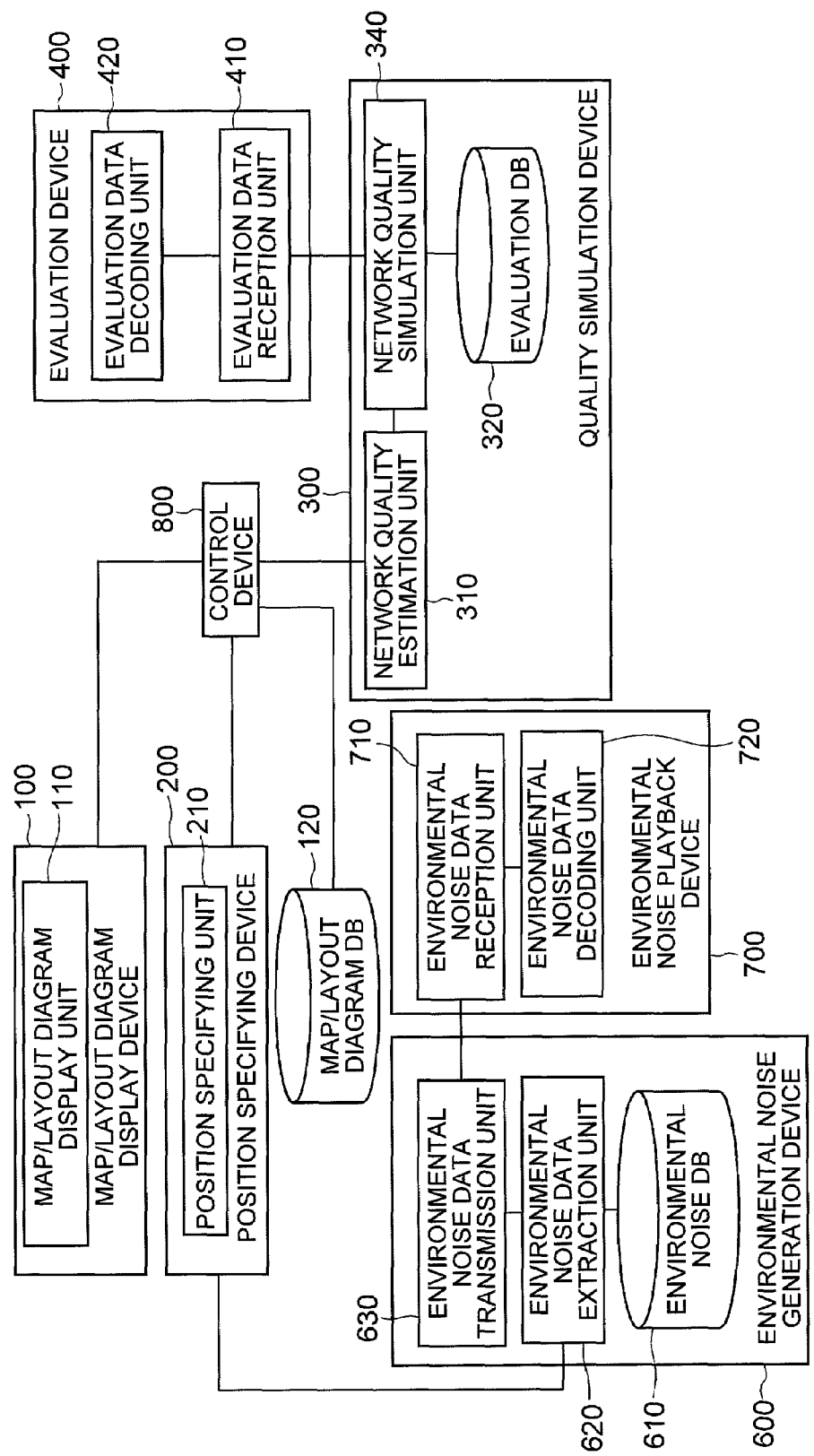
FIG. 12 is a block diagram showing the configuration of a fifth exemplary embodiment of a communication quality evaluation system.

DESCRIPTION OF REFERENCE NUMERALS 100 map/layout diagram display device
110 map/layout diagram display unit
120 map/layout diagram DB
200, 201a, 201b position specifying device
210, 211a, 211b position specifying unit
300, 301, 302, 303 quality simulation device
310, 311 network quality estimation unit
310a quality parameter calculation unit
310b radio wave environment DB
310c traffic DB
310d quality parameter extraction unit
310e quality measurement DB
312 radio wave environment estimation unit
312a radio wave environment extraction unit
312b radio wave environment DB
320 evaluation DB
322 evaluation data transmission/reception unit
340 network quality simulation unit
342 radio wave environment simulation unit 343 evaluation data extraction unit
400, 401a, 401b, 401c, 401d evaluation device
410 evaluation data reception unit
411a, 411b, 411c, 411d evaluation data transmission/reception unit
420 evaluation data decoding unit
421a, 421b, 421c, 421d evaluation data encoding/decoding unit
500 actual system
510, 550 evaluation data transmission/reception unit
520, 540 network control device
530 communication network
600 environmental noise generation device
610 environmental noise DB
620 environmental noise data extraction unit
630 environmental noise data transmission unit
700 environmental noise playback device
710 environmental noise data reception unit
720 environmental noise data decoding unit
800 control unit

The invention claimed is:

1. A communication quality evaluation system for evaluating communication quality of a communication system, comprising:
a map or layout diagram display device which displays a map or a layout diagram of a specified area in a communication network for a wireless communication system;
a control unit which displays the map or the layout diagram of the specified area on the map or layout diagram display device in accordance with an instruction by an evaluator;
a position specifying device which specifies a plurality of evaluation points for which the evaluator evaluates the communication quality, within the map or the layout diagram shown on the map or layout diagram display device;
a network quality estimation unit which estimates network quality when communications are performed between the plurality of evaluation points specified by the position specifying device;
wherein the network quality estimation unit includes:
a radio wave environment database in which radio wave environment data indicating radio wave environments of respective locations are stored while being associated with the respective locations;
a traffic database in which traffic data indicating traffic volumes of respective locations are stored while being associated with the respective locations; and
a quality parameter calculation unit which calculates a quality parameter for estimating the network quality, and
the quality parameter calculation unit extracts radio wave environment data corresponding to the evaluation points from the radio wave environment database, extracts traffic data corresponding to the evaluation points from the traffic database, and calculates the quality parameter based on the extracted radio wave environment data and the extracted traffic data to estimate the network quality at the evaluation points;
a quality simulation unit which deteriorates evaluation data to be used for evaluating communication quality according to the network quality estimated by the quality estimation unit, and outputs the deteriorated evaluation data; and
an evaluation device which receives the deteriorated evaluation data from the quality simulation unit, and outputs the deteriorated evaluation data to the evaluator and obtains evaluator perceived quality for the deteriorated evaluation data from the evaluator.

2. The communication quality evaluation system, according to claim 1, wherein the evaluation data deteriorated by the quality simulation unit is a sample of data to be actually transmitted and received in the communication system.

3. The communication quality evaluation system, according to claim 1, wherein the control unit specifies the plurality of evaluation points for evaluating communication quality by the evaluator within the display range of the map or the layout diagram displayed on the display unit in accordance with the instruction by the evaluator,
the quality estimation unit estimates network quality when communications are performed between the specified evaluation points, and
the quality simulation unit deteriorates, according to the network quality estimated by the quality estimation unit, the evaluation data which is data to be transmitted and received between a plurality of evaluation devices and is a sample of data to be actually transmitted and received in the communication system, and transmits the deteriorated evaluation data to the plurality of evaluation devices for evaluating the communication quality.

4. The communication quality evaluation system, according to claim 1, wherein
the quality estimation unit estimates a radio wave environment when communications are performed at the evaluation point, and
the quality simulation unit deteriorates the evaluation data to be used for evaluating the communication quality according to the radio wave environment estimated by the quality estimation unit, and transmits the deteriorated evaluation data to the evaluation device via the communication system which is actually operated.

5. The communication quality evaluation system, according to claim 4, wherein the quality estimation unit includes:
a radio wave environment extraction unit which extracts radio wave environment data corresponding to the evaluation point from the radio wave environment database, and estimates the network quality based on the extracted radio wave environment data.

6. The communication quality evaluation system, according to claim 4, wherein the radio wave environment database stores radio wave environment data calculated by means of radio wave propagation estimation using a deterministic propagation estimation method.

7. The communication quality evaluation system, according to claim 1, further comprising:
an evaluation database in which the evaluation data, which is a sample of the data to be actually transmitted and received in the communication system, is applied with deterioration processing due to the network quality and stored while being associated with locations, wherein
the quality simulation unit extracts the evaluation data from the evaluation database according to the network quality estimated by the quality estimation unit, and transmits the data to the evaluation device.

8. The communication quality evaluation system, according to claim 1, further comprising:
an environmental noise database in which environmental noise data, which is sound data of noises corresponding to locations where the evaluation device is used, is stored while being associated with the locations;
an environmental noise data extraction unit which extracts environmental noise data from the environmental noise database according to the evaluation point specified; and an evaluation noise playback unit which outputs a sound according to the environmental noise data extracted by the environmental noise data extraction unit.

9. The communication quality evaluation system, according to claim 1, wherein the quality estimation unit includes:
a quality database in which quality parameters for estimating the network quality are stored while being associated with locations; and
a quality parameter extraction unit which extracts a quality parameter corresponding to the evaluation point from the quality database, and estimates the network quality based on the extracted quality parameter.

10. The communication quality evaluation system, according to claim 1, wherein a communication device to be used by a user is used as the evaluation device.

11. The communication quality evaluation system, according to claim 1, wherein
the evaluation point is specified by the evaluator over the communication network in the control unit, and
the quality simulation unit transmits evaluation data to the evaluation device over the communication network.

12. The communication quality evaluation system according to claim 1, wherein two of the position specifying devices specify two evaluation points, and two of the evaluation devices according to the respective evaluation points transmit and receive evaluation data to thereby enable communication quality evaluation to be performed in a dialogue form.

13. A communication quality evaluation method for evaluating communication quality of a communication system, comprising:
displaying a map or a layout diagram of a specified area in a communication network for a wireless communication system;
specifying a plurality of evaluation points for evaluating communication quality by an evaluator within the display range of the map or the layout diagram displayed on a display device in accordance with an instruction by the evaluator;
and estimating network quality when communications are performed between the plurality of specified evaluation points;
wherein the estimating network quality includes;
a radio wave environment database in which radio wave environment data indicating radio wave environments of respective locations are stored while being associated with the respective locations, and a traffic database in which traffic data indicating traffic volumes of respective locations are stored while being associated with the respective locations; and
extracting radio wave environment data corresponding to the evaluation points from the radio wave environment database, extracting traffic data corresponding to the evaluation points from the traffic database, calculating a quality parameter based on the extracted radio wave environment data and the extracted traffic data to thereby estimate the network quality at the evaluation points;
deteriorating evaluation data to be used for evaluating communication quality according to the estimated network quality, and outputting the deteriorated evaluation data; and evaluating the communication quality by receiving the deteriorated evaluation data, and outputting the deteriorated evaluation data to the evaluator and obtaining evaluator perceived quality for the deteriorated evaluation data from the evaluator.

14. The communication quality evaluation method according to claim 13, wherein a sample of data to be actually transmitted and received in the communication system is used as the evaluation data.

15. The communication quality evaluation method according to claim 13, further comprising:
specifying the plurality of evaluation points for evaluating communication quality by the evaluator within the display range of the map or the layout diagram displayed on the display unit in accordance with the instruction by the evaluator,
estimating network quality when communications are performed between the specified evaluation points; and
transmitting the evaluation data, which is data to be transmitted and received between a plurality of evaluation devices and is a sample of data to be actually transmitted and received in the communication system, to the plurality of evaluation devices.

16. The communication quality evaluation method according to claim 13, further comprising:
estimating a radio wave environment when communications are performed at the evaluation point;
deteriorating the evaluation data to be used for evaluating the communication quality according to the estimated radio wave environment; and
transmitting the deteriorated evaluation data to the evaluation device via the communication system which is actually operated.

17. The communication quality evaluation method according to claim 13, further comprising:
including an evaluation database in which the evaluation data, which is a sample of the data to be actually transmitted and received in the communication system, is applied with deterioration processing due to the network quality and stored while being associated with locations, and
extracting the evaluation data from the evaluation database according to the network quality, and transmitting the data to the evaluation device.

18. The communication quality evaluation method according to claim 13, further comprising:
having an environmental noise database in which environmental noise data, which is sound data of noises corresponding to locations where the evaluation device is used, is stored while being associated with the locations;
extracting environmental noise data from the environmental noise database according to the evaluation point specified; and outputting a sound according to the extracted environmental noise data.

19. The communication quality evaluation method according to claim 13, further comprising:
having a quality database in which quality parameters for estimating the network quality are stored while being associated with locations; and
extracting a quality parameter corresponding to the evaluation point from the quality database, and estimating the network quality based on the extracted quality parameter.

* * * * *